US011277180B1

(12) United States Patent
Raghavan et al.

(10) Patent No.: US 11,277,180 B1
(45) Date of Patent: Mar. 15, 2022

(54) APPARATUS AND METHOD FOR LOW OVERHEAD FREQUENCY-AVERAGED BEAM PATTERN FEEDBACK IN MILLIMETER WAVE POSITIONING SYSTEMS

(71) Applicant: QUALCOMM Incorporated, San Diego, CA (US)

(72) Inventors: Vasanthan Raghavan, West Windsor Township, NJ (US); Sony Akkarakaran, Poway, CA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/095,262

(22) Filed: Nov. 11, 2020

(51) Int. Cl.
*H04B 7/06* (2006.01)
*H01Q 3/26* (2006.01)

(52) U.S. Cl.
CPC ......... *H04B 7/0617* (2013.01); *H01Q 3/2617* (2013.01); *H04B 7/0634* (2013.01)

(58) Field of Classification Search
CPC . H04W 64/003; H04B 7/0617; H04B 7/0634; H01Q 3/2617
See application file for complete search history.

(56) References Cited

U.S. PATENT DOCUMENTS

| | | | | |
|---|---|---|---|---|
| 2011/0244883 | A1* | 10/2011 | Quade | H04W 64/003 455/456.1 |
| 2013/0029685 | A1* | 1/2013 | Moshfeghi | G06Q 20/409 455/456.1 |
| 2021/0368358 | A1* | 11/2021 | Sheng | H04W 24/10 |
| 2021/0399777 | A1* | 12/2021 | Ihalainen | H04B 7/0617 |

* cited by examiner

*Primary Examiner* — Vineeta S Panwalkar
(74) *Attorney, Agent, or Firm* — Paradice and Li LLP

(57) ABSTRACT

The position of a mobile device is estimated using angle based positioning measurements. The angle based positioning measurements are generated using transmit (Tx) beams or receive (Rx) beams from one or more base stations that generate the beams over an ultra-wide bandwidth, which produces frequency and spatial distortions and impairments in an array gain response. The array gain distribution variation as a function of angle and frequency for the set of beam weights used in beamforming is conveyed to indicate the frequency and spatial distortions. The array gain distribution variation may be provided to the mobile device in assistance data for a sub-band that is only a portion of the allocated bandwidth for the base stations, or as an aggregation of the array gain distribution variation for a plurality of sub-bands of the allocated bandwidth to reduce the overhead in signaling.

46 Claims, 17 Drawing Sheets

APPARATUS AND METHOD FOR LOW OVERHEAD FREQUENCY-AVERAGED BEAM PATTERN FEEDBACK IN MILLIMETER WAVE POSITIONING SYSTEMS

BACKGROUND

Field

Subject matter disclosed herein relates to estimation of a location of a mobile device and more particularly to support for positioning using beams produced by a mmW small cells.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may transmit a positioning reference signal (PRS). A mobile device acquiring PRSs transmitted by different base stations may deliver signal-based measurements to a location server, which may be part of an Evolved Packet Core (EPC) or 5G Core Network (5GCN), for use in computing a location estimate of the mobile device. For example, a UE may generate positioning measurements from the downlink (DL) PRS such as Reference Signal Time Difference (RSTD), Reference Signal Received Power (RSRP), and reception and transmission (RX-TX) time difference measurements, which may be used in various positioning methods, such as Time Difference of Arrival (TDOA), Angle of Departure (AoD), and multi-cell Round Trip Time (RTT). Alternatively, a mobile device may compute an estimate of its own location using various positioning methods. Other position methods that may be used for a mobile device include use of a Global Navigation Satellite System (GNSS) such as GPS, GLONASS or Galileo and use of Assisted GNSS (A-GNSS) where a network provides assistance data to a mobile decide to assist the mobile device in acquiring and measuring GNSS signals and/or in computing a location estimate from the GNSS measurements.

With 5G NR cellular networks, small cells are playing a more and more important role. For example, it is sometimes desirable for operators to deploy many small cells to enhance capacity on top of macrocell coverage. Small cells, which use Millimeter Wave ("mmW") transmission (sometimes referred to as Frequency 2 and Frequency 4 and beyond), are predicted to expand their footprint worldwide because mmW can provide a greater spectrum width and shorter air interface latency than found in macrocells. In particular, mmW small cell deployment is expected to be particularly useful for indoor environments, e.g., driven by extremely high data rate expectations, e.g. Gbps level. The expanding deployment of small cells, particularly in environments where positioning is difficult, e.g., indoor environments, provides additional positioning opportunities.

SUMMARY

The position of a mobile device is estimated using angle based positioning measurements. The angle based positioning measurements are generated using transmit (Tx) beams or receive (Rx) beams from one or more base stations that generate the beams over an ultra-wide bandwidth, which produces frequency and spatial distortions and impairments in an array gain response. The array gain distribution variation as a function of angle and frequency for the set of beam weights used in beamforming is conveyed to the mobile device in assistance data for a sub-band that is only a portion of the allocated bandwidth for the base stations, or as an aggregation of the array gain distribution variation for a plurality of sub-bands of the allocated bandwidth to reduce the overhead in signaling.

In one implementation, a method for supporting positioning of a mobile device in a wireless network performed by the mobile device may include receiving assistance data for positioning, the assistance data comprising an array gain distribution variation as a function of angle and frequency for a set of beam weights used in beamforming by at least one base station. The method may include measuring at least one angle based positioning measurement of reference signals received from the at least one base station based on the assistance data. The method may include generating position information based on the at least one angle based positioning measurement.

In one implementation, a mobile device configured for supporting positioning of the mobile device in a wireless network may include a wireless transceiver configured to wirelessly communicate in the wireless network; at least one memory; at least one processor coupled to the wireless transceiver and the at least one memory. The at least one processor may be configured to receive, via the wireless transceiver, assistance data for positioning, the assistance data comprising an array gain distribution variation as a function of angle and frequency for a set of beam weights used in beamforming by at least one base station. The at least one processor may be configured to measure at least one angle based positioning measurement of reference signals received from the at least one base station based on the assistance data. The at least one processor may be configured to generate position information based on the at least one angle based positioning measurement.

In one implementation, a mobile device configured for supporting positioning of the mobile device in a wireless network, includes means for receiving assistance data for positioning, the assistance data comprising an array gain distribution variation as a function of angle and frequency for a set of beam weights used in beamforming by at least one base station. The mobile device may include means for measuring at least one angle based positioning measurement of reference signals received from the at least one base station based on the assistance data. The mobile device may include means for generating position information based on the at least one angle based positioning measurement.

In one implementation, a non-transitory storage medium including program code stored thereon, the program code is operable to configure at least one processor in a mobile device to support positioning of the mobile device in a wireless network, includes program code to receive assistance data for positioning, the assistance data comprising an array gain distribution variation as a function of angle and frequency for a set of beam weights used in beamforming by at least one base station. The non-transitory storage medium includes program code to measure at least one angle based positioning measurement of reference signals received from the at least one base station based on the assistance data. The non-transitory storage medium includes program code to generate position information based on the at least one angle based positioning measurement.

In one implementation, a method for supporting positioning of a mobile device in a wireless network performed by a location server, may include obtaining an array gain distribution variation as a function of angle and frequency for a set of beam weights used in beamforming by at least one base station. The method may include receiving at least one angle based positioning measurement for the mobile device from at least one network node. The method may include determining a position estimate of the mobile device based on the at least one angle based positioning measurement and the array gain distribution variation as the function of angle and frequency for the set of beam weights used by the at least one base station.

In one implementation, a location server for supporting positioning of a mobile device in a wireless network may include an external interface configured to communicate in the wireless network; at least one memory; and at least one processor coupled to the external interface and the at least one memory. The at least one processor may be configured to obtain, via the external interface, an array gain distribution variation as a function of angle and frequency for a set of beam weights used in beamforming by at least one base station. The at least one processor may be configured to receive, via the external interface, at least one angle based positioning measurement for the mobile device from at least one network node. The at least one processor may be configured to determine a position estimate of the mobile device based on the at least one angle based positioning measurement and the array gain distribution variation as the function of angle and frequency for the set of beam weights used by the at least one base station.

In one implementation, a location server for supporting positioning of a mobile device in a wireless network may include a means for obtaining an array gain distribution variation as a function of angle and frequency for a set of beam weights used in beamforming by at least one base station. The location server includes a means for receiving at least one angle based positioning measurement for the mobile device from at least one network node. The location server includes a means for determining a position estimate of the mobile device based on the at least one angle based positioning measurement and the array gain distribution variation as the function of angle and frequency for the set of beam weights used by the at least one base station.

In one implementation, a non-transitory storage medium including program code stored thereon, the program code is operable to configure at least one processor in a location server to support positioning of a mobile device in a wireless network includes program code to obtain an array gain distribution variation as a function of angle and frequency for a set of beam weights used in beamforming by at least one base station. The non-transitory storage medium includes program code to receive at least one angle based positioning measurement for the mobile device from at least one network node. The non-transitory storage medium includes program code to determine a position estimate of the mobile device based on the at least one angle based positioning measurement and the array gain distribution variation as the function of angle and frequency for the set of beam weights used by the at least one base station.

In one implementation, a method for supporting positioning of a mobile device in a wireless network performed by a location server, may include obtaining an array gain distribution variation as a function of angle and frequency for at least one set of beam weights used in beamforming by at least one base station. The method may include preparing assistance data for positioning for the mobile device based on the array gain distribution variation as the function of angle and frequency for the at least one set of beam weights used in beamforming by the at least one base station. The method may include sending to the mobile device the assistance data for positioning with the array gain distribution variation as the function of angle and frequency for the at least one set of beam weights used in beamforming by the at least one base station.

In one implementation, a location server configured for supporting positioning of a mobile device in a wireless network may include an external interface configured to communicate in the wireless network; at least one memory; and at least one processor coupled to the external interface and the at least one memory. The at least one processor may be configured to obtain, via the external interface, an array gain distribution variation as a function of angle and frequency for at least one set of beam weights used in beamforming by at least one base station. The at least one processor may be configured to prepare assistance data for positioning for the mobile device based on the array gain distribution variation as the function of angle and frequency for the at least one set of beam weights used in beamforming by the at least one base station. The at least one processor may be configured to send, via the external interface, to the mobile device the assistance data for positioning with the array gain distribution variation as the function of angle and frequency for the at least one set of beam weights used in beamforming by the at least one base station.

In one implementation, a location server configured for supporting positioning of a mobile device in a wireless network may include means for obtaining an array gain distribution variation as a function of angle and frequency for at least one set of beam weights used in beamforming by at least one base station. The location server may include means for preparing assistance data for positioning for the mobile device based on the array gain distribution variation as the function of angle and frequency for the at least one set of beam weights used in beamforming by the at least one base station. The location server may include means for sending to the mobile device the assistance data for positioning with the array gain distribution variation as the function of angle and frequency for the at least one set of beam weights used in beamforming by the at least one base station.

In one implementation, a non-transitory storage medium including program code stored thereon, the program code is operable to configure at least one processor in a location server configured for supporting positioning of a mobile device in a wireless network may include program code to obtain an array gain distribution variation as a function of angle and frequency for at least one set of beam weights used in beamforming by at least one base station. The non-transitory storage medium includes program code to prepare assistance data for positioning for the mobile device based on the array gain distribution variation as the function of angle and frequency for the at least one set of beam weights used in beamforming by the at least one base station. The non-transitory storage medium includes program code to send to the mobile device the assistance data for positioning with the array gain distribution variation as the function of angle and frequency for the at least one set of beam weights used in beamforming by the at least one base station.

In one implementation, a method for supporting positioning of a mobile device in a wireless network performed by a base station, may include obtaining an array gain distribution variation as a function of angle and frequency for at least one set of beam weights used in beamforming used by the base station. The method may include sending to a location server the array gain distribution variation as the function of angle and frequency for the at least one set of beam weights used in beamforming by the base station.

In one implementation, a base station configured for supporting positioning of a mobile device in a wireless network may include an external interface configured to communicate in the wireless network; at least one memory; and at least one processor coupled to the external interface and the at least one memory. The at least one processor may be configured to obtain an array gain distribution variation as a function of angle and frequency for at least one set of beam weights used in beamforming used by the base station. The at least one processor may be configured to send, via the external interface, to a location server the array gain distribution variation as the function of angle and frequency for the at least one set of beam weights used in beamforming by the base station.

In one implementation, a base station configured for supporting positioning of a mobile device in a wireless network may include means for obtaining an array gain distribution variation as a function of angle and frequency for at least one set of beam weights used in beamforming used by the base station. The base station includes means for sending to a location server the array gain distribution variation as the function of angle and frequency for the at least one set of beam weights used in beamforming by the base station.

In one implementation, a non-transitory storage medium including program code stored thereon, the program code is operable to configure at least one processor in a base station configured for supporting positioning of a mobile device in a wireless network may include program code to obtain an array gain distribution variation as a function of angle and frequency for at least one set of beam weights used in beamforming used by the base station. The non-transitory storage medium includes program code to send to a location server the array gain distribution variation as the function of angle and frequency for the at least one set of beam weights used in beamforming by the base station.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
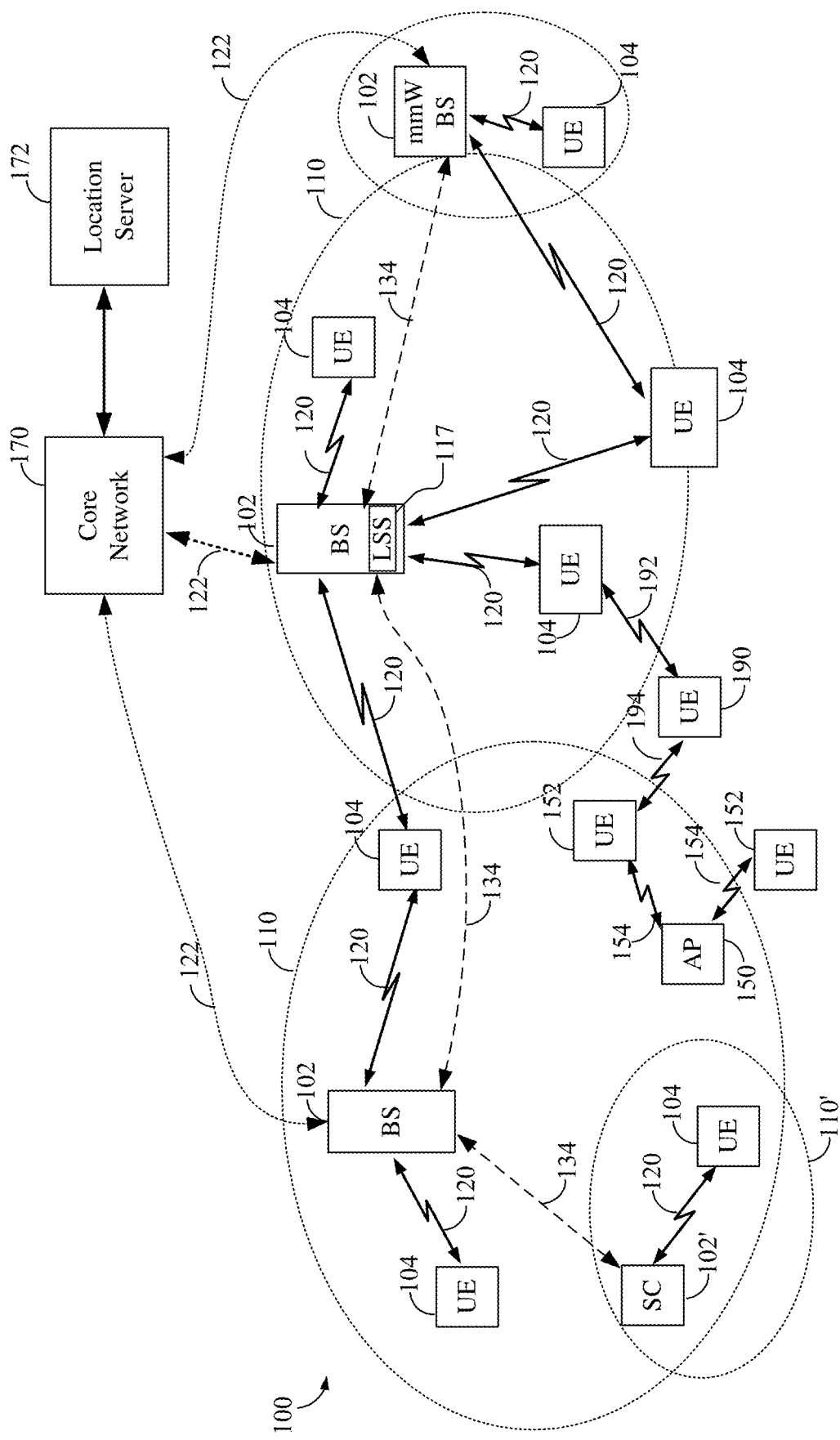
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE, e.g. for the GNSS, TDOA, AoD, Multi-RTT, and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein. It is also noted that the term "posSIB", as used herein, refers to a System Information Block (SIB) which includes assistance data (also referred to as "positioning assistance data") to support positioning of one or more UEs. However, in some instances, the term "SIB" is used herein to refer to a SIB containing assistance data to support positioning of one or more UEs. It is further noted that the terms "SI messages" and "positioning SI messages" are used interchangeably herein to refer to system information messages containing assistance data, e.g. assistance data in the form of one or more posSIBs.

Small cells using mmW transmissions are expected to be deployed in 5G NR cellular networks in increasing amounts and in environments where radio signal based positioning is conventionally difficult, e.g., in indoor environment or dense urban settings. Small cells utilize an array of antennas in a MIMO system for beamforming. With a large number of antenna elements, beamforming can be used to produce very narrow beams, e.g. 3 dB beamwidth of 15° or even smaller Very narrow beams may be swept horizontally (azimuthally) and vertically (elevation) to form a spatial grid of beams.

Information related to which beam in the spatial grid of beams is received by a UE may provide accurate position information for the UE, without requiring the transmission of specific reference signals by the TRP or positioning measurements of reference signals by the UE. By combining information related to which beams are received by the UE from several neighboring small cell TRPs, an accurate position estimate for the UE may be produced, e.g., based on intersection of the beams.

Positioning in millimeter wave systems is of broad interest in Release 16 and beyond. For example, implementation of positioning using millimeter wave transmissions is progressing, e.g., for UE-based, UE-assisted, positioning techniques, as well as for Ul, DL, or UL and DL approaches to estimate Angle of Departure (AoD) and/or Angle of Arrival (AoA) at the gNB.

In addition to millimeter wave systems, e.g., Frequency Range 2 (FR2) that includes frequency bands from 24.25 GHz to 52.6 GHz, shorter wave systems are being investigated such as Frequency Range 4 (FR4) which includes frequency bands from 52.6 GHz to 114.25 GHz bands, which is sometimes referred to as "upper millimeter wave bands." Extensions to even higher carrier frequencies may be considered in future 3GPP releases. For example, the "sub-THz" regime could begin at 100 or 275 GHz (depending on the context of usage) and extend till 1000 GHz. These are expected to be part of beyond FR4 (or sometimes labeled as FR5) systems. The wavelengths at upper millimeter wave bands are smaller than wavelengths at FR2 (e.g., 28 or 39 GHz), and thus more antenna elements may be packed in the same physical aperture in FR4 or FR5 than at FR2, e.g., FR4 uses a large antenna array than FR2.

The focus of Release 17 is in 52.6 GHz to 71 GHz ranges. With this range, an approximately 14 GHz wide bandwidth is available across multiple geographies (e.g., between 57-71 GHz) allowing significant performance/beamforming gains. In many devices, a single radio frequency (RF) chain is likely to be used over the approximately 14 GHz ultra-wide bandwidth range. Since a single RF chain uses a single set of phase shifters and gain stages, analog/RF beamforming is constrained, which may lead to poor performance at certain frequencies.

It is desirable to help a UE with assistance information that considers specific features of upper millimeter wave bands and UE side impairments. However, may be accomplished in a low overhead manner to account for the ultra-wide bandwidth operation in some implementations.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). For example, small cell base stations may be "Medium Range Base Stations" and "Local Area Base Stations" as defined in section 4.4 of 3GPP Technical Specification (TS) 38.104, which include base stations characterized by requirements derived from Micro Cell scenarios with a BS to UE minimum distance along the ground equal to 5 m or a minimum coupling loss equals to 53 dB or by requirements derived from Pico Cell scenarios with a BS to UE minimum distance along the ground equal to 2 m or a minimum coupling loss equal to 45 dB. In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. Location server 172 may be internal or external to the core network 170. In some implementations, the location server 172 may be an E-SMLC in the case of LTE access, a standalone SMLC (SAS) in the case of UMTS access, an SMLC in the case of GSM access, a SUPL Location Platform (SLP), or a Location Management Function (LMF) in the case of 5G NR access. Additionally or alternatively, the location server may be within the RAN and may be co-located with or part of a serving base station 102, which is sometimes referred to as a Location Server Surrogate (LSS) 117. The LSS 117 may replace the location server 172 or may operate in conjunction with the location server 172, e.g., performing some functions that would be otherwise be performed by location server 172, e.g., to improve latency. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 102, which may be a small cell base station, that may operate in mmW frequencies and/or near mmW frequencies in communication with a UE 104. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 102 and the UE 104 may utilize beamforming (transmit and/or receive) over a mmW communication link 120 to compensate for the extremely high path loss and short range. Further, it will be appreciated that in alternative configurations, one or more base stations 102 may also transmit using mmW or near mmW and beamforming. Moreover, the mmW base station may operate in upper millimeter wave bands) e.g., between 52.6 GHz to 114.25 GHz, or some frequency allocation within that range, e.g., 52.6 GHz to 71 GHz or other ranges. Alternately, ultra wide bandwidth operation can also be in sub-THz frequencies (beyond either 100 GHz or 275 GHz or 300 GHz depending on how the sub-THz regime is defined). Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102, UEs 104) operate is divided into multiple frequency ranges, FR1 (from 450 to 6000 MHz), FR2 (from 24250 to 52600 MHz), and FR4 (between 52.6 GHz-114.25 GHz bands). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104 and the cell in which the UE 104 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104 in a cell may have different downlink primary carriers. The same is true for the uplink primary carriers. The network is able to change the primary carrier of any UE 104 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by a macro cell base stations 102 may be an anchor carrier (or "PCell") and other frequencies utilized by the macro cell base stations 102 and/or the mmW base station 102 may be secondary carriers ("SCells"). The simultaneous transmission and/or reception of multiple carriers enables the UE 104 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 104 that may communicate with a macro cell base station 102 over a communication link 120 and/or the mmW base station 102 over a mmW communication link 120. For example, the macro cell base station 102 may support a PCell and one or more SCells for a UE and the mmW base station 102 may support one or more SCells for a UE.

Figure 2A:
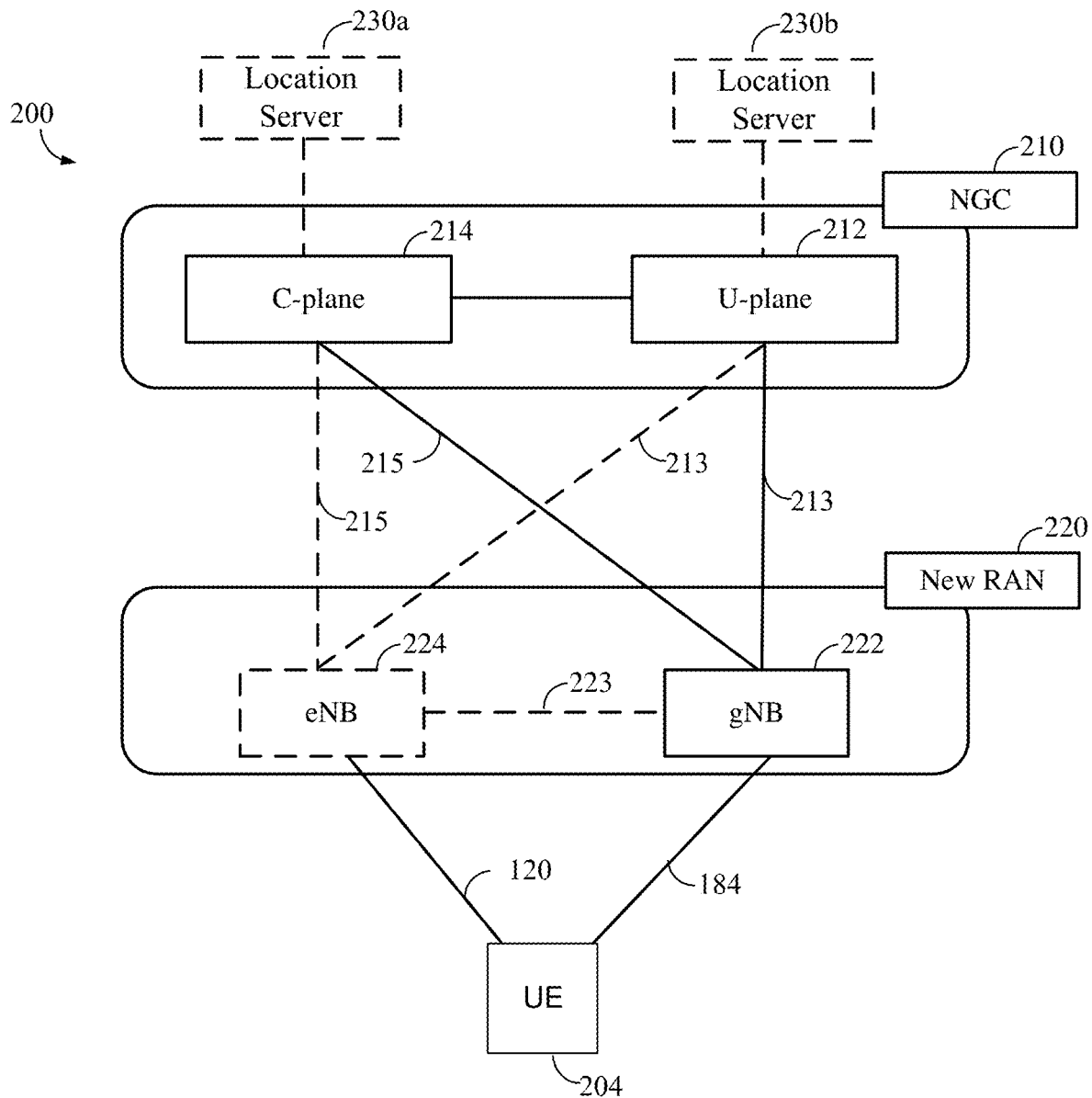
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230*a*, 230*b* (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the RAN 220. Additionally, a Location Server Surrogate (LSS) (such as LSS 117 shown in FIG. 1) may be located in the RAN 220, e.g., co-located with a gNB 222, and may perform one or more location management functions.

Figure 2B:
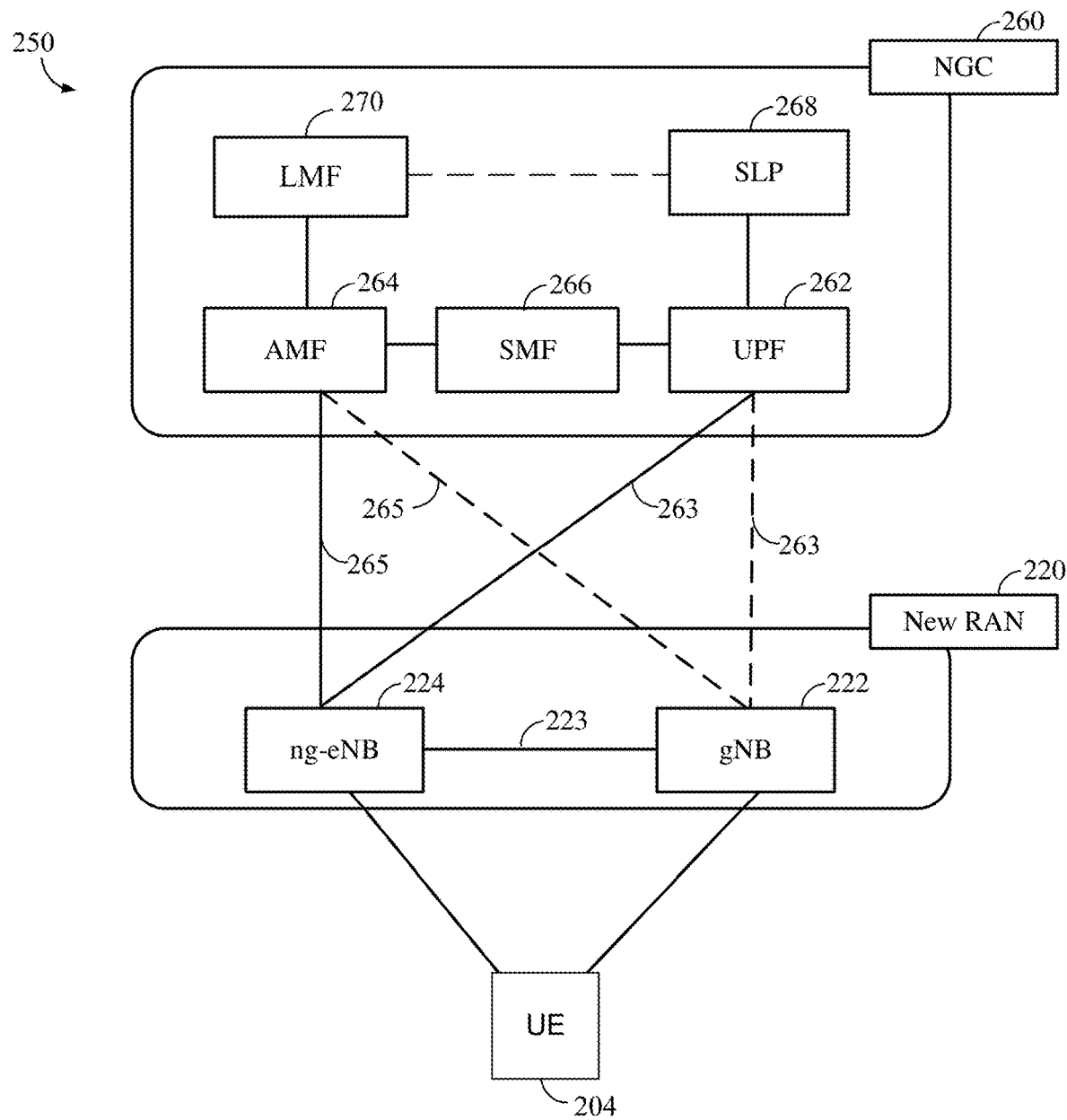

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either ng-gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
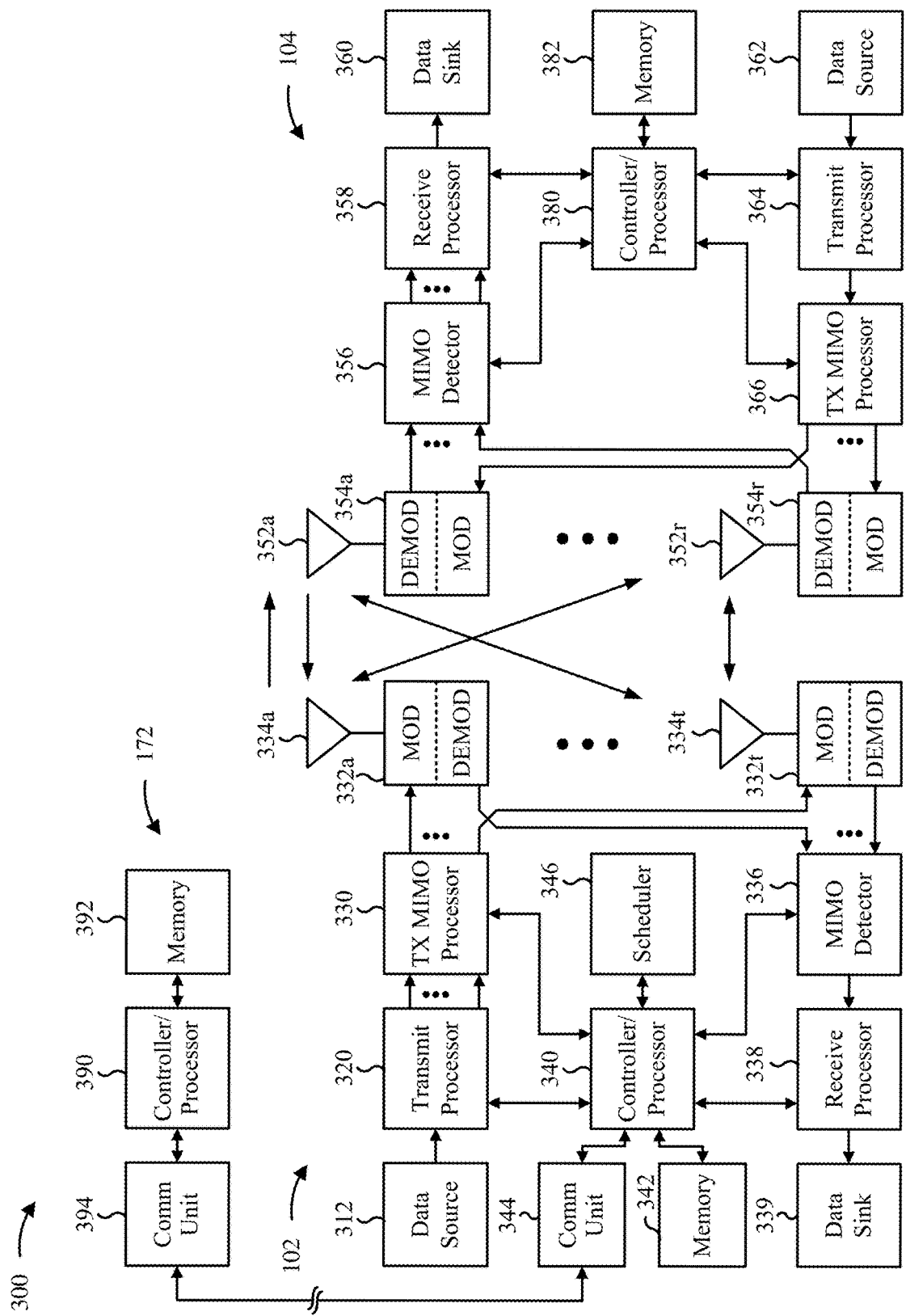
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334*a* through 334*t*, and UE 104 may be equipped with R antennas 352*a* through 352*r*, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332*a* through 332*t*. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332*a* through 332*t* may be transmitted via T antennas 334*a* through 334*t*, respectively. According to various aspects described in more detail below, the synchronization signals can be generated with location encoding to convey additional information.

At UE 104, antennas 352*a* through 352*r* may receive the downlink signals from base station 102 and/or other base stations and may provide received signals to demodulators (DEMODs) 354*a* through 354*r*, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354*a* through 354*r*, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354*a* through 354*r* (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to a network controller, such as location server 172 via communication unit 344, which may include one or more intervening elements. Location server 172 may include communication unit 394, controller/processor 390, and memory 392.

Controller/processor 340 of base station 102, controller/processor 380 of UE 104, controller 390 of location server 172, which may be location server 172, and/or any other component(s) of FIG. 3 may perform one or more techniques associated broadcasting positioning assistance data in a differential manner, as described in more detail elsewhere herein. For example, controller/processor 380 of UE 104, controller 390 of location server 172, controller/processor 340 of base station 102, and/or any other component(s) of FIG. 3 may perform or direct operations of, for example, processes 1400, 1500, 1600, and 1700 of FIGS. 14, 15, 16, and 17, and/or other processes as described herein. Memories 342, 382, and 392 may store data and program codes for base station 102, UE 104, and location server 172, respectively. In some aspects, memory 342 and/or memory 382 and/or memory 392 may comprise a non-transitory computer-readable medium storing one or more instructions for wireless communication. For example, the one or more instructions, when executed by one or more processors of the UE 104, location server 172, and/or base station 102, may perform or direct operations of, for example, processes 1400, 1500, 1600, and 1700 of FIGS. 14, 15, 16, and 17 and/or other processes as described herein. A scheduler 346 may schedule UEs for data transmission on the downlink and/or uplink.

As indicated above, FIG. 3 is provided as an example. Other examples may differ from what is described with regard to FIG. 3.

In particular implementations, the UE 104 may have circuitry and processing resources capable of obtaining location related measurements (also referred to as location measurements), such as measurements for signals received from GPS or other Satellite Positioning Systems (SPS's), measurements for cellular transceivers such as base stations 102, and/or measurements for local transceivers. UE 104 may further have circuitry and processing resources capable of computing a position fix or estimated location of UE 104 based on these location related measurements. In some implementations, location related measurements obtained by UE 104 may be transferred to a location server, such as the location server 172, location servers 230*a*, 230*b*, or LMF 270, after which the location server may estimate or determine a location for UE 104 based on the measurements.

Location related measurements obtained by UE 104 may include measurements of signals received from satellite vehicles (SVs) that are part of an SPS or Global Navigation Satellite System (GNSS) such as GPS, GLONASS, Galileo or Beidou and/or may include measurements of signals received from terrestrial transmitters fixed at known locations (e.g., such as base station 102 or other local transceivers). UE 104 or a separate location server (e.g. location server 172) may then obtain a location estimate for the UE 104 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), TDOA, AoA, AoD, multi-RTT, or combinations thereof. In some of these techniques (e.g. A-GNSS, AFLT and OTDOA), pseudoranges or timing differences may be measured by UE 104 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 104. Here, location servers, such as location server 172, location servers 230*a*, 230*b*, or LMF 270 may be capable of providing positioning assistance data to UE 104 including, for example, information regarding signals to be measured by UE 104 (e.g., expected signal timing, signal coding, signal frequencies, signal Doppler), locations and/or identities of terrestrial transmitters, and/or signal, timing and orbital information for GNSS SVs to facilitate positioning techniques such as A-GNSS, AFLT, OTDOA TDOA, AoA, AoD, multi-RTT, and ECID. The facilitation may include improving signal acquisition and measurement accuracy by UE 104 and/or, in some cases, enabling UE 104 to compute its estimated location based on the location measurements. For example, a location server may comprise an almanac (e.g., a Base Station Almanac (BSA)) which indicates the locations and identities of cellular transceivers and transmitters (e.g. base stations 102) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 104 may obtain measurements of signal strength (e.g. received signal strength indication (RSSI) or reference signal received power (RSRP)) for signals received from cellular transceivers (e.g., base stations 102) and/or local transceivers and/or may obtain a signal to noise ratio (S/N), a reference signal received quality (RSRQ), or a round trip signal propagation time (RTT) between UE 104 and a cellular transceiver (e.g., base stations 102) or a local transceiver. A UE 104 may transfer these measurements to a location server, to determine a location for UE 104, or in some implementations, UE 104 may use these measurements together with positioning assistance data (e.g. terrestrial almanac data or GNSS SV data such as GNSS Almanac and/or GNSS Ephemeris information) received from the location server to determine a location for UE 104.

An estimate of a location of a UE 104 may be referred to as a location, location estimate, location fix, fix, position, position estimate or position fix, and may be geodetic, thereby providing location coordinates for the UE 104 (e.g., latitude and longitude) which may or may not include an altitude component (e.g., height above sea level, height above or depth below ground level, floor level or basement level). Alternatively, a location of the UE 104 may be expressed as a civic location (e.g., as a postal address or the designation of some point or small area in a building such as a particular room or floor). A location of a UE 104 may also include an uncertainty and may then be expressed as an area or volume (defined either geodetically or in civic form) within which the UE 104 is expected to be located with some given or default probability or confidence level (e.g., 67% or 95%). A location of a UE 104 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term location may comprise any of these variants unless indicated otherwise. Measurements (e.g. obtained by UE 104 or by another entity such as base station 102) that are used to determine (e.g. calculate) a location estimate for UE 104 may be referred to as measurements, location measurements, location related measurements, positioning measurements or position measurements and the act of determining a location for the UE 104 may be referred to as positioning of the UE 104 or locating the UE 104.

Figure 4:
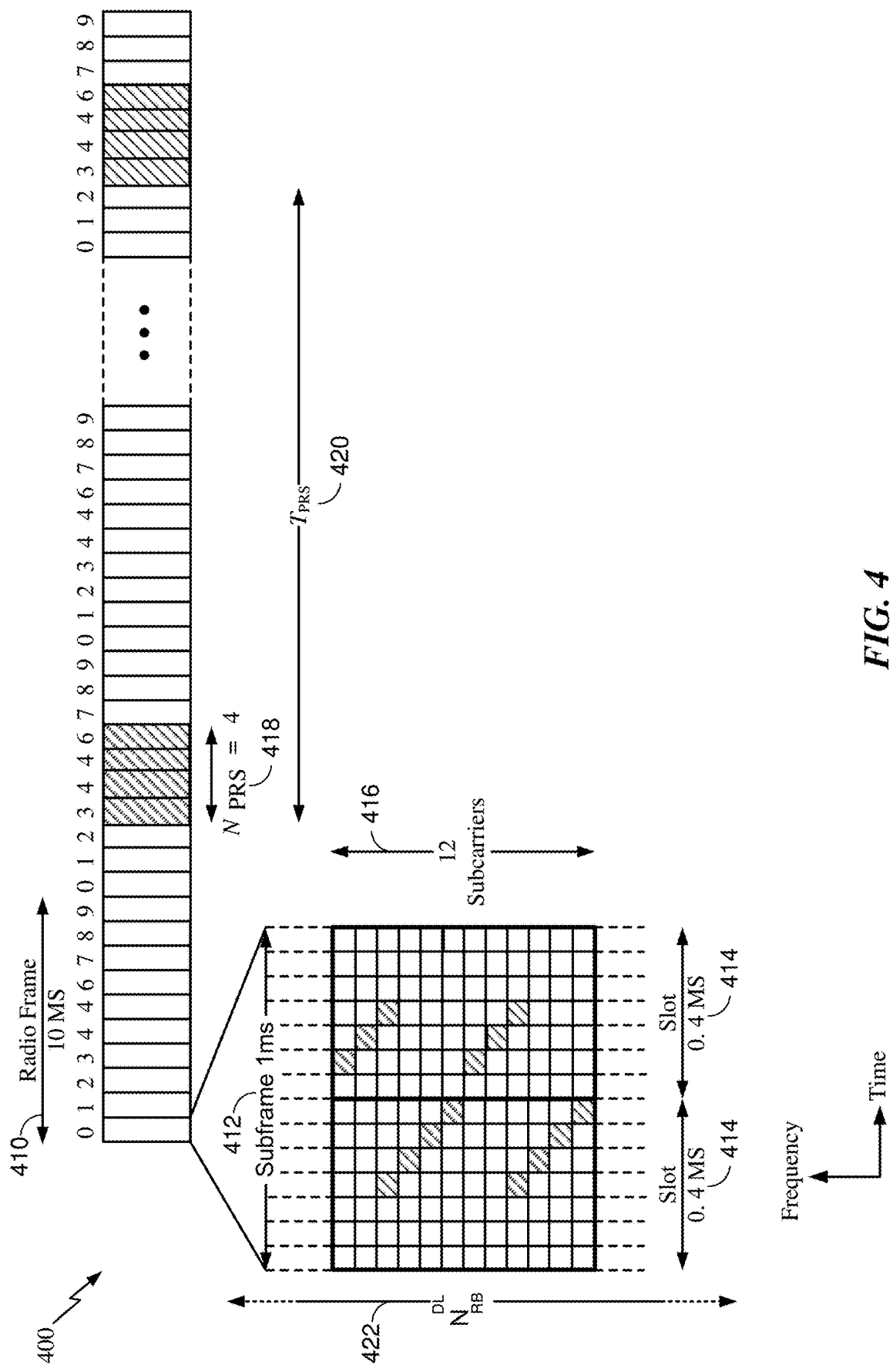
FIG. 4 shows a structure of an exemplary subframe sequence for a positioning reference signal (PRS).

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as NM=12. For a given channel bandwidth, the number of available resource blocks on each channel 422, which is also called the transmission bandwidth configuration 422, is indicated as V. For example, for a 3 MHz channel bandwidth in the above example, the number of available resource blocks on each channel 422 is given by Na=15. Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e. a downlink (DL) PRS according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $N_{ID}^{PRS}$) or as a function of a physical cell identifier (PCI) (denoted as $N_{ID}^{cell}$) if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that is intended for positioning. Downlink (DL) or sidelink (SL) signals for which the primary purpose is unrelated to positioning, such as control or communication, are referred to herein as non-positioning reference signals (non-PRS). Examples of non-PRS include, but are not limited to, PHY channels, such as SSB, TRS, CSI-RS, PDSCH, DM-RS, PDCCH, PSSCH, and PSCCH. As discussed herein, the non-PRS signals, which are typically transmitted for purposes unrelated to positioning, may also be used by the UE for positioning purposes, e.g., in a hybrid positioning measurement. Similar to DL PRS transmitted by base stations, discussed above, a UE may transmit UL PRS for positioning, as well as UL or SL non-PRS that may be used for positioning. The UL PRS may be, e.g., sounding reference signals (SRS) for positioning.

Using received DL PRS or non-PRS from base stations or SL signaling from other UEs, and/or UL PRS or non-PRS transmitted to base stations or SL to other UEs, the UE may perform various positioning measurements, such as reference signal time difference (RSTD) measurements for time difference of arrival (TDOA) a positioning technique, reference signal received power (RSRP) measurements for TDOA, Angle of Departure (AoD), Angle of Arrival (AoA), and Round Trip Time (RTT) or multi cell RTT (multi-RTT) positioning techniques, time difference between reception and transmission of signals (Rx-Tx) for a multi-RTT positioning technique, etc.

Various positioning technologies rely on DL, UL or SL PRS, which may also use the DL, UL, or SL non-PRS. For example, positioning technologies that use reference signal include downlink based positioning, uplink based positioning, and combined downlink and uplink based positioning. For example, downlink based positioning includes positioning methods such as DL-TDOA and DL-AoD. Uplink based positioning includes positioning method such as UL-TDOA and UL-AoA. Downlink and uplink based positioning includes positioning method, such as RTT with one or more neighboring base station (multi-RTT). Other positioning methods exist, including methods that do not rely on PRS. For example, Enhanced Cell-ID (E-CID) is based on radio resource management (RRM) measurements.

Currently, positioning assistance data for PRS beams includes the azimuth and elevation angles of each DL-PRS Resource (beam), but does not provide any beam width information. The knowledge of PRS beam width (also some other beam pattern information, such as side lobe or back lobe information) may be used to assist in receiving the DL PRS beams, and may be used to enable the adaptation of UE Rx antenna for the purpose of UE power saving. For example, if a PRS beam is wide angle beam, a UE receiver with a single antenna will be highly likely to achieve high quality positioning measurement. Accordingly, the UE may configure its receiver with a single Rx antenna (or reduced number of Rx antennas) to save power consumption.

As discussed above, a number of positioning approaches are supported in 3GPP. In Release 16, assistance data from the network, e.g., location server 172, to UE 104 is provided within the NR Positioning Protocol (NRPP) of 3GPP 38.455 or LTE Positioning Protocol (LPP) of 3GPP 37.355. There are several gNB side angle estimation approaches for positioning. Downlink (DL) AoD based approach, for example, uses knowledge of the beam shapes of different gNB transmitted positioning reference symbol (PRS) beams along with knowledge of the received RSRPs with these PRSs at the UE to estimate the DL AoD. This estimation may occur on the network side, e.g., in the location server 172 in "UE-assisted" mode where the UE reports the measured RSRPs. Alternatively, in "UE-based" mode, the estimation may occur at the UE 104 which is informed of the beam shapes, including AoD used with PRS, e.g., in assistance data, and the UE 104 determines the identity of a received DL beam from which the DL AoD may be determined, and a position estimate may be generated. Currently, only the beam's boresight direction is indicated in assistance data.

Uplink (UL) AoA based approach, as another example, estimates the position of the UE 105 by the gNB or network, e.g., location server 172, based on the measurement of the UE's uplink transmissions (e.g., SRS) at the base stations 102. The base station reports its estimated AoA to a location server 172, which may be reported in global coordinate system (GCS) or local coordinate system (LCS). The reporting may be different for azimuth angle and elevation angle.

Figure 5:
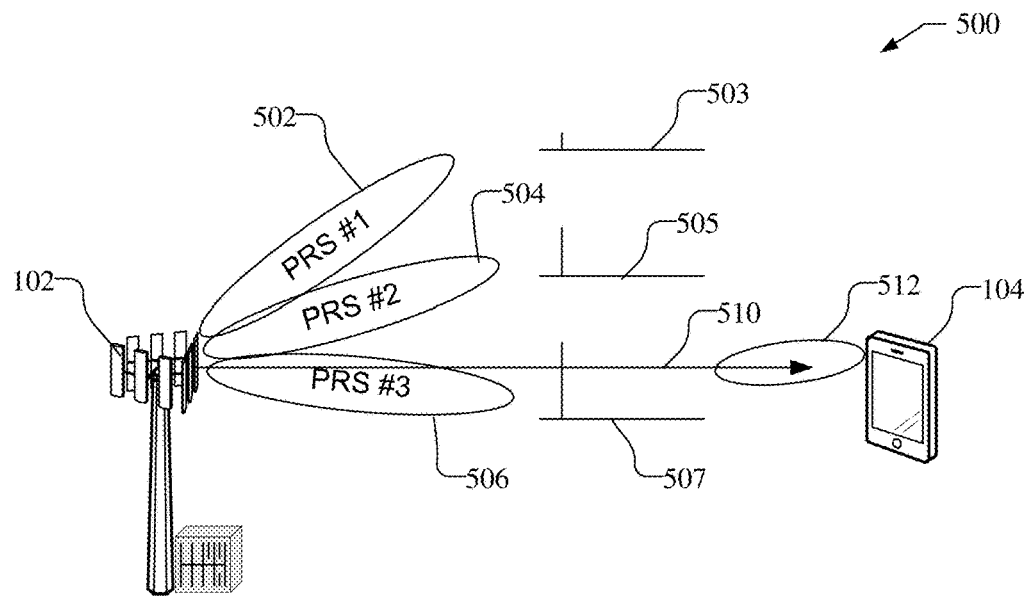
FIG. 5 shows an illustration of downlink (DL) Angle of Departure (AoD) position determination.

FIG. 5, by way of example, illustrates a DL-AoD procedure 500 performed by a UE 104. The base station 102, which may be a gNB, transmits PRS resources in a beam-sweeping manner, illustrated as beams 502, 504, and 506, labeled as PRS #1, PRS #2, and PRS #3, respectively. The UE 104 may measure the RSRP of each PRS resource, illustrated by PRS beams 502, 504, and 506, using a beamformed receive beam 512. The measured RSRP for each PRS beam 502, 504, and 506, as illustrated by the respective graphs 503, 505, and 507, where the height of the bar is proportional to the RSRP for each respective PRS beam. As illustrated, the PRS beam 506 which is most closely aligned with the line of sight (LOS) 510 between the base station 102 and the UE 104 has the greatest RSRP. PRS beams 502 and 504 (PRS #1 and PRS #2) are not aligned with the LOS 510, and accordingly, relatively low RSRPs are observed. In contrast, the PRS beam 506 (PRS #3) is closely aligned with the LOS 510, and a relatively high RSRP is observed.

In UE-assisted mode, the UE 104 reports the measured RSRPs through LPP protocol to the location server 172, e.g., location server 172, where the corresponding AoDs are estimated and position calculation of the UE 104 is performed. For example, based on the measured RSRPs, the PRS resource most closely aligned with the LOS 510 to the UE 104 can be determined. The directionality of each PRS source is known by the location server 172 and, accordingly, the direction of the UE 104 with respect to the base station 102 can be determined based on the direction of the PRS resource with the highest RSRP. Additionally, the RSRP may be used to determine the range between the UE 104 and the base station 102. Thus, both the direction and distance with respect to the base station 102 may be determined thereby providing an estimated position of the UE 104.

In UE-based mode, the UE 104 may use assistance data, provided by the location server 172, including the TRP geographic locations, and the PRS beam information (e.g., beam azimuth, elevation) to calculate an estimated position of the UE 104.

Figure 6A:
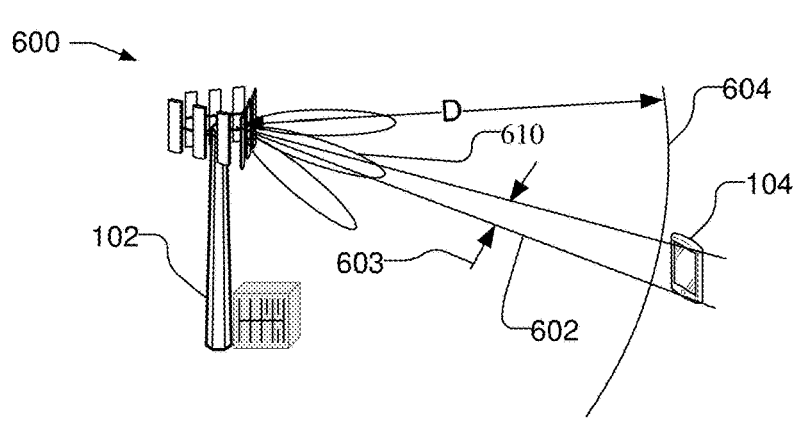
FIG. 6A shows an illustration of uplink (UL) Angle of Arrival (AoA) position determination using a single base station.

FIG. 6A, by way of example, illustrates an UL-AoA procedure 600 performed by a single base station 102. An AoA measurement is generated by a base station 102 using a directional antenna array such as a phased array that produces a number of receive beams 610, which may be used to determine the direction from which a signal, e.g., SRS signal, from the UE 104 was transmitted. For example, the receive beam 610 with the strongest signal from the UE 105 is likely aligned with the direction from which the signal from the UE 104 was transmitted. FIG. 6A illustrates an AoA measurement 602 from which the UE 105 transmits a signal as including an uncertainty 603. A single base station 110 may determine the position of the UE 105 using an AoA measurement when combined with a range estimate 604, e.g., using RTT.

Figure 6B:
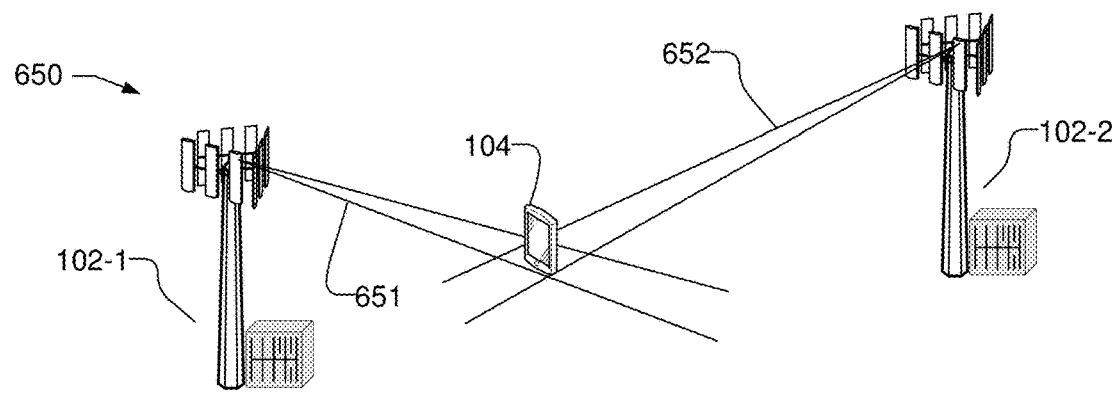
FIG. 6B shows an illustration of uplink (UL) Angle of Arrival (AoA) position determination using multiple base stations.

FIG. 6B, by way of example, illustrates an UL-AoA procedure 650 performed by a number of base stations 102-1 and 102-2. As illustrated AoA measurements 651 and 652 determined by respective base stations 102-1 and 102-2 intersect at the position of the UE 105.

Figure 7:
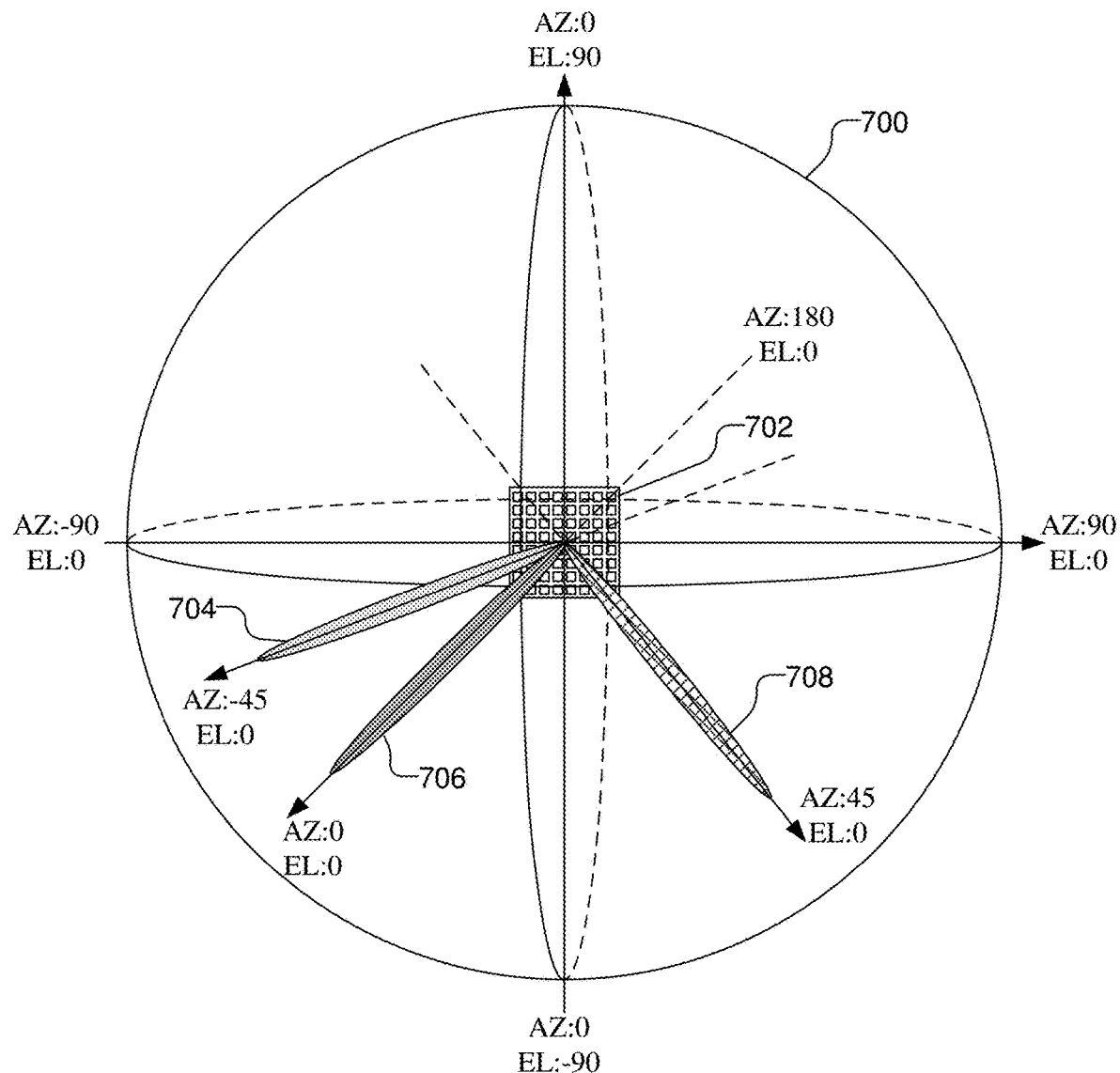
FIG. 7 shows an example of narrow beams produced by a mmW antenna panel.

FIG. 7 illustrates an example of narrow beams produced by a mmW small cell antenna panel 702. The antenna panel 702 includes a number of separate antennas which are provided RF current from the transmitter with the correct phase relationship so that the radio waves from the separate antennas add together to increase the radiation in a desired direction, while cancelling to suppress radiation in undesired directions, to produce a beam. The beam can be steered to point in different directions, e.g., changing the azimuth angle and elevation angle, without moving the antenna panel 702. FIG. 7, for example, illustrates the antenna panel 702 in the center of a sphere 700 showing azimuth angles from 0°, ±90°, to 180°, and elevation angles from 0°, ±90°, to 180°. The antenna panel 702 may be controlled to produce beams at various angles, illustrated as beams 704, 706, and 708. In general, the antenna panel 702 may produce an azimuth span of 120° and an elevation span of 60°. By increasing the number of individual antennas present in the antenna panel 702, the width of the beams produced may be reduced. Initial link acquisition at base stations are performed over beamformed transmissions in Secondary Synchronization Blocks (SSBs). Beam refinement beyond the SSB stage is either performed over channel state information reference signals (CSI-RSs) or sounding reference signals (SRSs). These stages lead to refined beams at both the base station and user ends.

Phased array beamforming over ultra wide bandwidths, such as used by an antenna panel 702 may suffer from signal direction change/offset, sometimes referred to as beam squinting. Beam squinting, for example, causes the beam direction to change as a function of operating frequency. Additionally, beams may suffer from frequency dependent distortions in spatial behavior due to effect of the antenna array housing (back plane made of plastic or metal, side bezel, etc.), polarization mismatches, elemental pattern variations, small array sizes, calibration impairments, etc. Moreover, the distortion effects of gain and direction may affect the main lobe, as well as side lobes, beam nulls, and grating lobes.

Figure 8A:
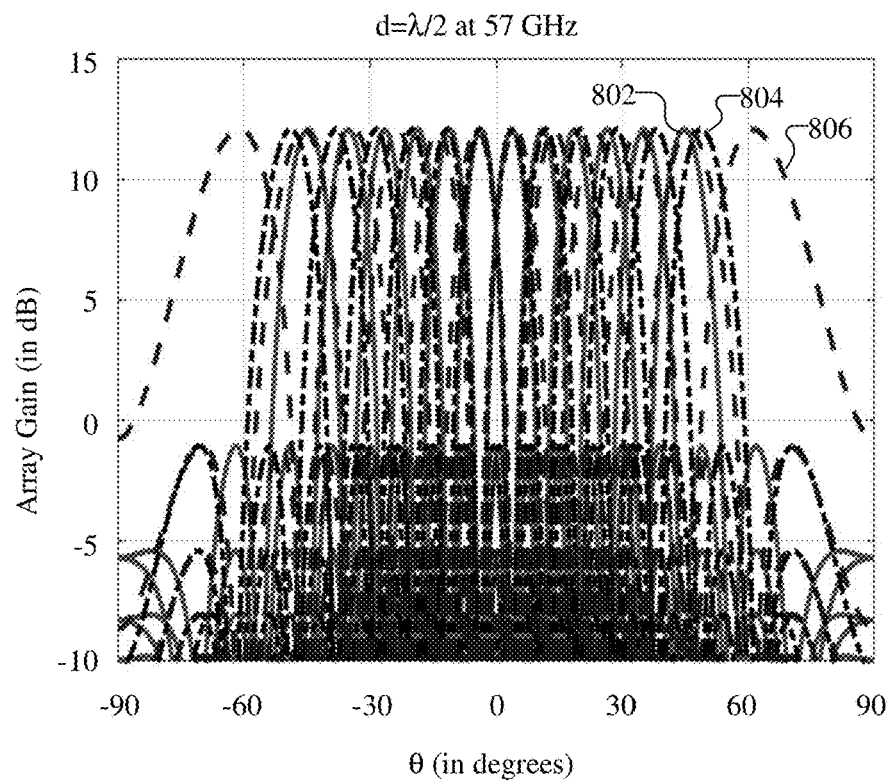
FIGS. 8A and 8B show illustrations of the array gain (in dB) as a function of angle and frequency for a 16×1 antenna array with an array spacing $d=\lambda/2$ at 57 GHz or 71 GHz, respectively, for multiple frequencies.
Figure 8B:
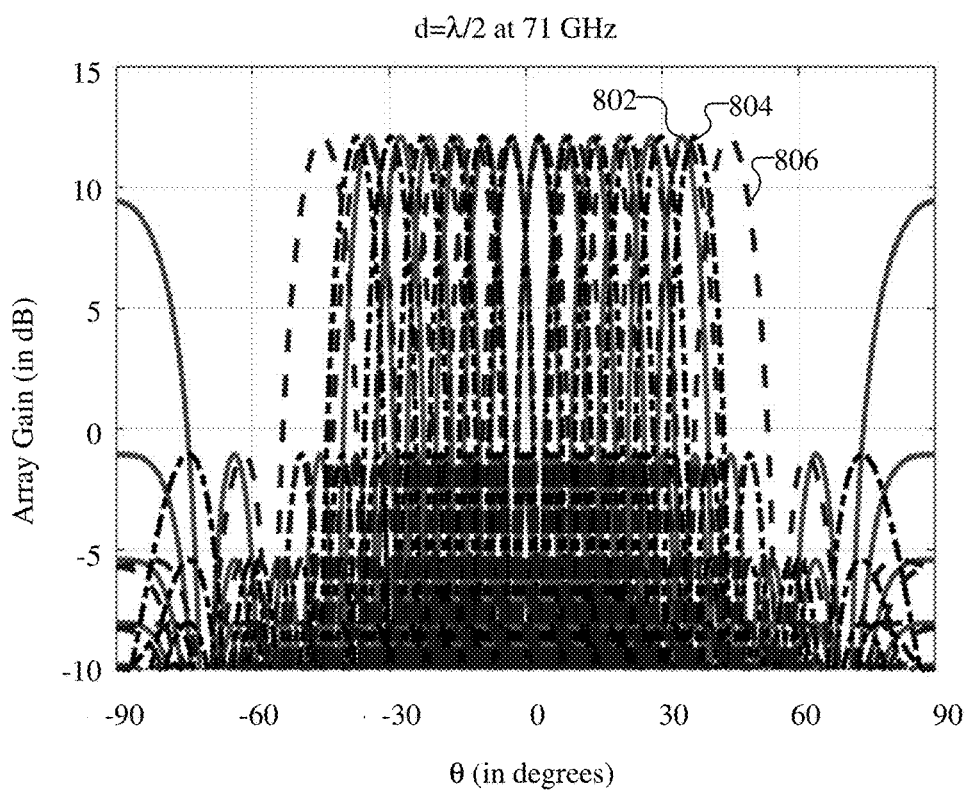

FIGS. 8A and 8B, for example, graphically illustrates the array gain (in dB) as a function of angle and frequency for a 16×1 antenna array with an array spacing d=2l2 at 57 GHz or 71 GHz, respectively. These fixed arrays are used over the 57-71 GHz range. In FIGS. 8A and 8B, for example, the array gain at frequencies 57-71 GHz is illustrated with three separate curves, e.g., curve 802 represents the array gain at 57 GHz, curve 804 represents the array gain at 61 GHz, and curve 806 represents the array gain at 71 GHz. The antenna array may be considered to cover, e.g., ±50° around boresight direction with a size-12 codebook.

The array gain performance with codebook designed for 57 or 71 GHz is illustrated in FIGS. 8A and 8B as the frequency changes. As can be seen, the array gain over frequencies 57-71 GHz, where 57 GHz is illustrated with solid curve 802, 61 GHz is illustrated with dash-dot curve 804, and 71 GHz is illustrated with dashed curve 806, are not well aligned over the spatial dimension for either antenna array design. If the array gain were well aligned over the spatial dimensions, the peaks of curves 802, 804, and 806 would be aligned for all angles, but as can be seen in FIGS. 8A and 8B, the peaks of curves 802, 804, and 806 are aligned at 0° and lose alignment as at larger angles. In other words, the beams do not correlate well with frequency (independent of design). A different beam index may work better at a different carrier frequency, especially towards the edge of coverage, e.g., around ±50° in the present example. Depending on the angle of interest, beams from either 57 GHz (curve 802) or 71 GHz (curve 806) may be better, and the gain differences may be significant ~2-3 dB. A smaller codebook size may be sufficient at center frequency $f_c$=71 GHz to cover the same area as that covered with $f_c$=57 GHz.

Thus, as can be seen, the array gain distribution as a function of spatial angles (beam pattern/shape) generally drifts with frequency due to beam squinting effects, which is due to the use of fixed inter-antenna element spacings in an antenna array for an entire frequency allocation. For ultra-wideband coverage, e.g., between frequencies 57 GHz to 71 GHz, the beam squinting effects on array gain distribution are pronounced, and will be even more pronounced with coverage of, e.g., frequency bands from 52.6 GHz to 114.25 GHz bands. The array gain distributional variations may include frequency dependent distortions in spatial behavior including the effect of the antenna array housing (back plane made of plastic or metal, side bezel, etc.), polarization mismatches, elemental pattern variations, small array sizes, calibration impairments, etc.

The effects of beam squinting may have negative effects on angle related positioning measurements. For example, positioning using a fixed set of beam weights at a certain carrier frequency can correspond to a certain AoD or AoA estimate at that frequency. However, the same set of beam weights corresponding to phase shifter and gain control combinations needed to steer a beam towards a certain direction such as e.g., codebooks in FR4 may not be changed, corresponds to a different AoD or AoA estimate at a different frequency. If the same beam weight corresponds to good RSRPs across frequencies, the AoD or AoA may be estimated differently based on which frequency is used. For example, referring to FIGS. 8A and 8B, it can be seen that the peaks of different frequencies (e.g., curves 802 and 806), particularly at the edge of coverage, are not aligned with each other and indicate significantly different angles.

In one implementation, to compensate for the above effects on positioning is to convey the transmit (Tx) and/or receive (Rx) beam pattern or shape (e.g., the array gain distribution variation as a function of angle and frequency) to a node in the network assisting with position estimation, e.g., the UE for UE based positioning or a location server for UE assisted positioning. The frequency of interest may be at least an active bandwidth part (BWP) in the UE, a set of Resource Blocks (RBs), or a set of component carrier frequencies. The node assisting with position estimation may be an LMF, eSMLC, Location Server Surrogate (LSS) (LMF-like functionality co-located or embedded with the base station or RAN), or serving base station (e.g., gNB/TRP with which UE is communicating). For example, in some implementations, there may be an LMF in the core network and an LSS embedded in the RAN or base station, and the LMF may 'offload' to different extents the positioning functionality to the LSS.

With ultra-wide bandwidth, e.g., 57 GHz to 71 GHz or more such as 52.6 GHz to 114.25 GHz, as proposed for FR4, there will be a large amount of data necessary to convey the transmit (Tx) and/or receive (Rx) beam pattern or shape, the array gain distribution variation as a function of angle and frequency, as there are more sampling frequencies. Accordingly, this approach may lead to high overheads for a BWP that is ultra-wideband. Thus, a low overhead approach for conveying the array gain distribution variation as a function of angle and frequency for transmit (Tx) and/or receive (Rx) beam pattern for positioning may be desired.

In one implementation, the array gain distribution variation as a function of angle and frequency for the set of beam weights used for beamforming by one or more base stations may be provided for a sub-band of the allocated bandwidth for the base stations. For example, the array gain distribution variation may be provided as function of a "smaller chunk" over the active BWP for the UE, which may be an ultra-wideband BWP. The "smaller chunk" may be a sub-band of a certain a priori and appropriately configured size. For example, the configuration may be based on UE parameters, such as the data rate of the mobile device, capability of the mobile device, and active BWP size in the mobile device, etc. The UE parameters, for example, may be provided by the UE, e.g., in a capabilities response message to the location server or other network node. Moreover, the size of the "smaller chunk" may be selected dynamically over time, e.g., the size of the sub-band of frequencies may differ over time, e.g., based on UE parameters.

In another implementation, the array gain distribution variation as a function of angle and frequency for the set of beam weights used for beamforming by one or more base stations may be provided as an aggregation or average of array gain distribution variations for a plurality of different sub-bands, or chunks, of the allocated bandwidth for the base stations. For example, the aggregation of array gain distribution variations may be provided for a plurality of sub-bands that spans the active BWP of the UE 104, which may be an ultra-wideband BWP. In one example, the aggregation of the array gain distribution variations may be a weighted averaging of the array gain distribution variations for the plurality of different sub-bands. The weights used in the weighted averaging may be, e.g., weights corresponding to the sizes of the sub-bands.

In another implementation, the array gain distribution variation as a function of angle and frequency for the set of beam weights used for beamforming by one or more base stations may be provided as a plurality of array gain distribution variations corresponding to a plurality of different sub-bands of the allocated bandwidth for the base stations. For example, the plurality of sub-bands may span the active BWP of the UE 104, which may be an ultra-wideband BWP.

In implementations, the type of array gain distribution variation that is used may be switched between positioning sessions or positioning measurements within a positioning session. For example, a first set of assistance data may include a first type of array gain distribution variation, e.g., any of the types discussed above, while a second set of assistance data may use a different type of array gain distribution variation.

There may be tradeoffs on the type of array gain distribution variation that is used. For example, an array gain distribution variation as a function of angle and frequency for a single sub-band, or chunk, or a plurality of different sub-bands to span an ultra-wide bandwidth BWP may lead to high signaling, assistance data, overhead, but better performance. In contrast, an array gain distribution variation as a function of angle and frequency that is an aggregation of the array gain distribution variation for a plurality of sub-bands, may lead to relatively poorer performance, but will have a lower signaling, assistance data, overhead. The approach used may depend on the UE 104 capability, the ability of the UE 104 to handle beam pattern signaling, assistance data overhead. The approach used may also depend on the of signaling used, and/or latency requirement. For example, low latency approaches may use L1/L2 signaling which may not be able to accommodate larger payloads well, and thus, a lower overhead solution may be preferred; while L3 (RRC) signaling may tolerate higher overhead/payloads. The approach used may also depend on positioning accuracy requirements. The various approaches may be used for both transmit (Tx) beam pattern, e.g., for DL AoD measurements, and receive (Rx) beam pattern, e.g., for UL AoA measurements.

Figure 9A:
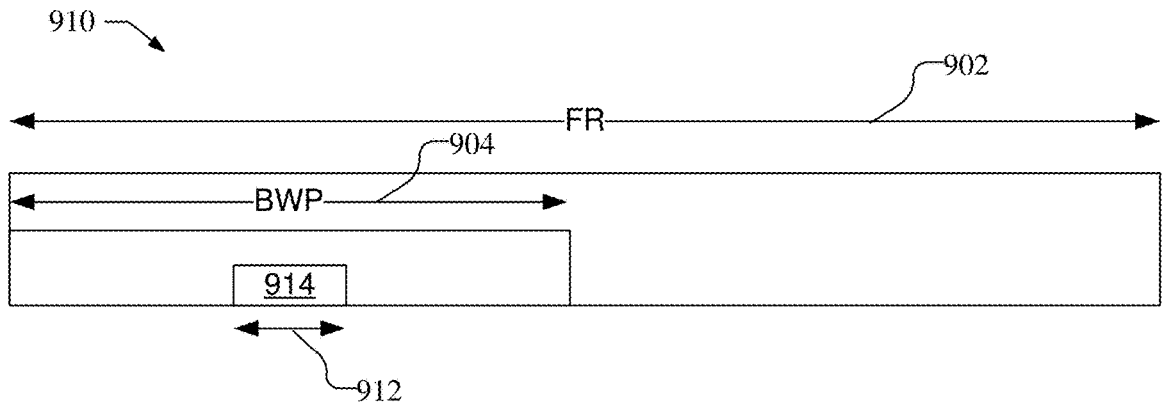
FIGS. 9A, 9B, and 9C show various types of array gain distribution variations as a function of angle and frequency for the set of beam weights use for beamforming by a base station that may be provided to a UE in assistance data.
Figure 9B:
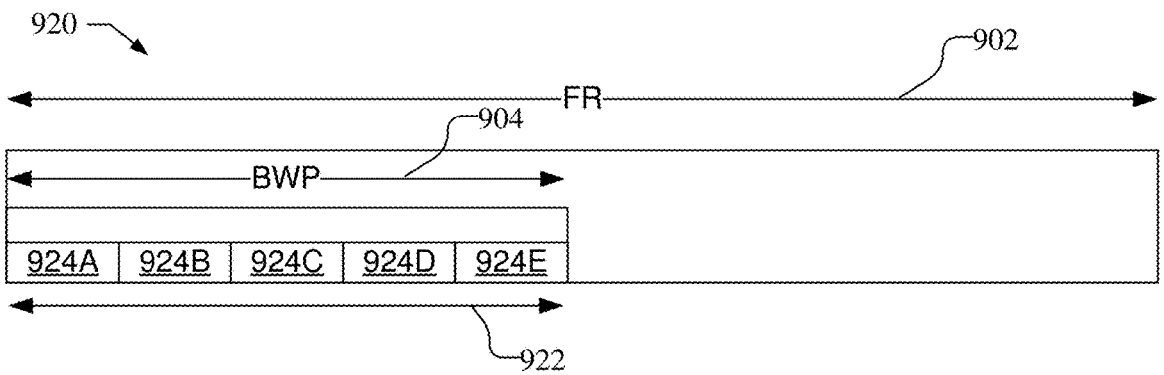
Figure 9C:
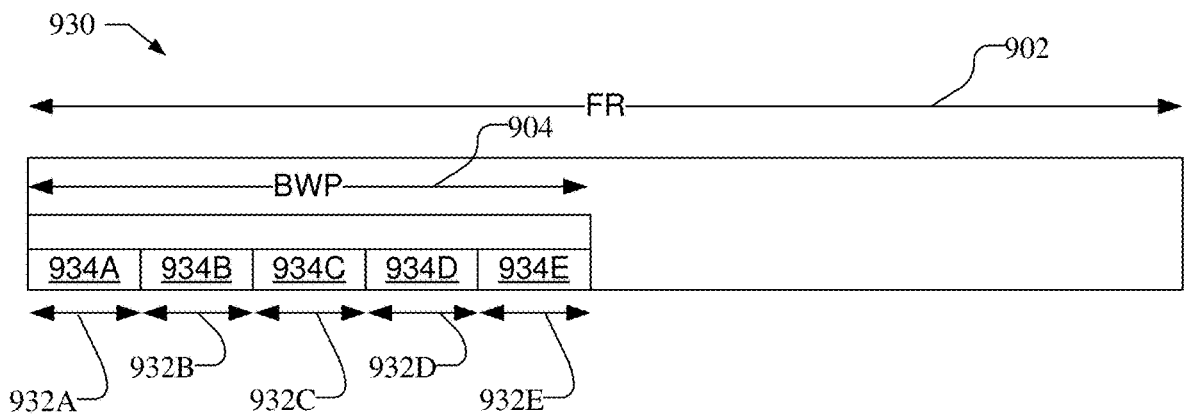

FIGS. 9A, 9B, and 9C illustrate various types of the array gain distribution variation as a function of angle and frequency for the set of beam weights use for beamforming by a base station. As illustrated in FIGS. 9A, 9B, and 9C, the allocated frequency (FR) for the base station is illustrated by arrow 902. The active bandwidth part (BWP) 904 for the UE 104 may be only a portion of the allocated frequency (FR) of the base station.

FIG. 9A illustrates a type 910 of array gain distribution variation as a function of angle and frequency for the set of beam weights used for beamforming by the base station that may be provided in which the array gain distribution variation 912 is provided as a single sub-band 914 of the allocated bandwidth 902 for the base station. The size of the sub-band 914, e.g., the range of frequencies in the sub-band 914, may be configured based on mobile device parameters, such as the data rate of the UE, capability of the UE, and active BWP size 904 in the UE. The size of the sub-band 914 may be dynamically selected, e.g., may be varied in different instances of assistance data.

FIG. 9B illustrates a type 920 of array gain distribution variation as a function of angle and frequency for the set of beam weights used for beamforming by the base station that may be provided in which the array gain distribution variation 922 is an aggregation, e.g., as an average, (as illustrated by arrow 922) of the array gain distribution variations for a plurality of different sub-bands 924A, 924B, 924C, 924D, and 924D (sometimes collectively referred to as sub-bands 924), of the allocated bandwidth 902 for the base station. For example, as illustrated, the aggregation 922 of the array gain distribution variations may be provided for a plurality of sub-bands 924 that spans the active BWP 904 of the UE 104, which may be an ultra-wideband BWP. The aggregation 922 of the array gain distribution variations, for example, may be weighted averaging of the array gain distribution variations for the plurality of different sub-bands 924, where the weights used in the weighted averaging may be based on the sizes of the sub-bands, or other factors, such as the sub-bands 924 location within the BWP 904.

FIG. 9C illustrates a type 930 of array gain distribution variation as a function of angle and frequency for the set of beam weights used for beamforming by the base station that may be provided as separate array gain distribution variations 932A, 932B, 932C, 932D, and 932E (sometimes referred to as array gain distribution variations 932) for a plurality of different sub-bands 934A, 934A, 934B, 934C, 934D, and 934E, respectively, (sometimes referred to as sub-bands 934) of the allocated bandwidth 902 for the base station. For example, as illustrated, separate array gain distribution variations 932 may be provided for a plurality of sub-bands 1132 that spans the active BWP 904 of the UE 104, which may be an ultra-wideband BWP.

The array gain distribution variation as a function of angle and frequency for the set of beam weights used for beamforming by the base station may be used to correct a AoD or AoA measurements generated by the UE 104 or base station 102. For example, when the UE 104 determines a received transmit (Tx) beam, e.g., as illustrated in FIG. 5, the angle of the transmit (Tx) beam may be adjusted as a function of the angle and frequency of the beam, as provided in the array gain distribution variation. Similarly, when angle of the receive (Rx) beam, e.g., as illustrated in FIGS. 6A and 6B, may be adjusted as a function of the angle and frequency of the beam, as provided in the array gain distribution variation. The adjustment of the angle of the beam, e.g. AoD or AoA, may be performed by the location server, or if the array gain distribution variation is provided to the UE 104, the UE may adjust the angle of the beam, e.g., for DL AoD measurements.

The UE 104, for example, may provide capability information to declare its capability associated with the ability to handle beam pattern assistance data overhead over an ultra-wide bandwidth operation for positioning applications. For example, the UE 104 may indicate a capability for at least one of low overhead associated with array gain distribution variation signaling over a small sub-band of the ultra-wide bandwidth BWP or a large overhead associated with array gain distribution variation signaling over at least two sub-bands of the active BWP for the UE 104, which may span the entire active BWP of the UE or may be less than the entire active BWP of the UE. The UE 104 may send the capability to a base station 102 or a network node associated with positioning estimation, e.g., a location server 172. The network node assisting with position estimation may be an LMF, eSMLC, LSS, or a serving base station with which the UE 104 is communicating.

The network node assisting with position estimation may generate an estimate of the DL AoD, and a position estimate of the UE, based on UE side measurements provided by the UE, and base station transmit (Tx) beam shape information, i.e., the array gain distribution variation as a function of angle and frequency for the set of beam weights used for beamforming by one or more base stations.

The network node assisting with position estimation may generate an estimate of the UL AoA, and a position of the UE, based on UE side transmission (e.g., SRS signals) measurements performed by one or more base stations and received (Rx) beam shape information, i.e., the array gain distribution variation as a function of angle and frequency for the set of beam weights used for beamforming by one or more base stations.

As discussed above, the array gain distribution variation, which is a function of angle and frequency, is used because it changes with carrier frequency due to, e.g., the use of fixed inter-element spacings between antenna elements in the antenna array, which leads to beam squinting. The array gain distributional variations may incorporate frequency dependent distortions in spatial behavior including the effect of housing, polarization mismatches, elemental pattern variations, small array sizes, calibration impairments, etc. Moreover, the array gain distribution variations may corresponds to gain and direction information of at least of one of the main lobe, side lobes, beam nulls, and grating lobes for the one or more base stations.

The assistance data provided to the UE with low overhead for the array gain distribution variation, may be a sub-band of the an ultra-wide bandwidth BWP. The sub-band may be, for example, of a certain a priori and appropriately configured size, which may be configured based on UE conditions or parameters, such as the data rate, capability, BWP size, etc. Moreover, the sub-band may be selected dynamically with time and can be different sizes.

The assistance data provided to the UE with low overhead for the array gain distribution variation may be aggregated or averaged array gain distribution variation for a number of sub-bands over the active BWP of the UE. The aggregation may be, for example, some subset of the sub-bands that span the active BWP of the UE, and thus, may include the full span of the active BWP or less than the full span of the active BWP. Additionally, the aggregation may be generated using weighted averaging with weights corresponding to the sub-band sizes.

Additionally, the UE may switch across the types of array gain distribution variation used (e.g. received in assistance data) based on at least one of type of signaling and/or latency requirement and positioning accuracy requirement.

Figure 10:
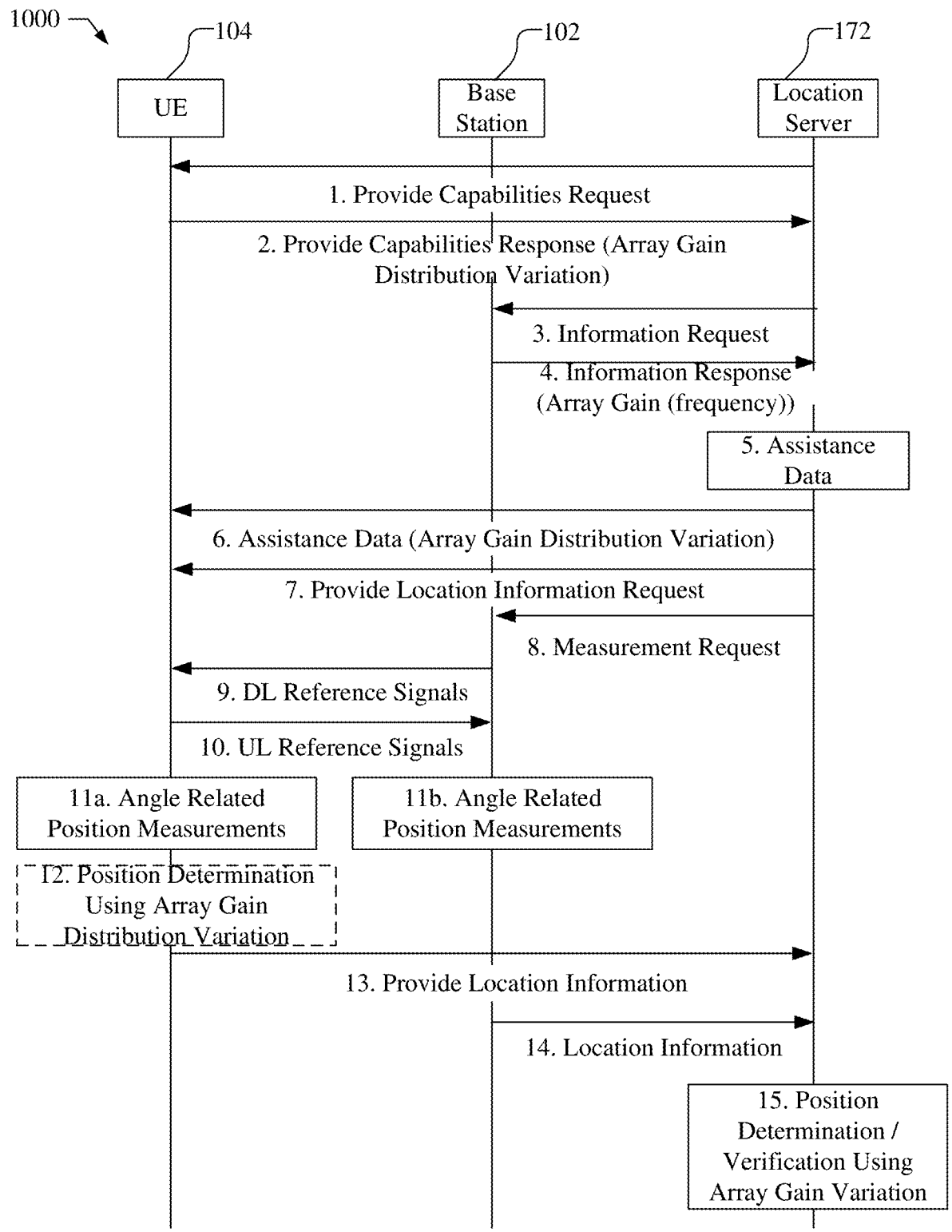
FIG. 10 shows an example of a signaling flow that illustrates various messages sent during a positioning session in which an array gain distribution variation as a function of angle and frequency for the set of beam weights used for beamforming by the base station that may be provided to support positioning.

FIG. 10, by way of example, shows an example of a signaling flow 1000 that illustrates various messages sent between components of the communication system 100 depicted in FIG. 1, during a positioning session in which an array gain distribution variation as a function of angle and frequency for the set of beam weights used for beamforming by the base station that may be provided to support positioning. FIG. 10 illustrates UE 104, a serving base station 102, and a location server 172. Base station 102 may be a gNB, ng-eNB, or eNB, and is capable of beamforming over an ultra-wide bandwidth for transmit (Tx) beams and/or receive (Rx) beams. The location server 172 may be, e.g., LMF 270 or an SLP 268, and eSMLC, an LSS or entity used for location that may be co-located with a base station 102 or RAN or may be in (or external) to the core network, or the serving base station 102. In implementations where an LSS or other network entity with LMF-like functionality that is co-located or embedded with the base station 102 or RAN, portions of the signaling may be sent to different entities, e.g., an LMF may generate assistance data, while the LSS may generate a position estimate. It should be understood that the UE 104 communications with the location server 172 through the serving base station 102 and one or more intervening components in the core network, such as AMF 264 or UPF 262. In the signaling flow 1000, it may be assumed that the UE 104 and location server 172 communicate using the LPP positioning protocol referred to earlier, although use of other protocols may be used. The signaling flow 1000 may be performed in control plane or user plane. The messages shown in signaling flow 1000 are provided for illustration and additional messages and actions may be included in the positioning session between the entities illustrated and/or entities not illustrated.

At stage 1, the location server 172 may send a provide capabilities request to the UE 104 requesting that the UE 104 provide its capabilities for positioning.

At stage 2, the UE 104 may send a provide capabilities response message to the location server 172, which may provide the UE's 104 positioning related capabilities, such as type of positioning measurements the UE 104 may generate and the type of assistance data the UE 104 may receive. For example, the UE 104 may indicate that it is capable of UE assisted or UE based positioning, or that the UE is capable of performing angle based positioning measurements using ultra-wide bandwidth. The UE 104 may indicate its capability to receive assistance data include the array gain distribution variation as a function of angle and frequency for the set of beam weights used for beamforming by one or more base stations and related overhead.

At stage 3, the location server 172 may send an Information Request message to the base station 102, and other base stations (not shown). The Information Request may request location related information from the base station 102, such as the location of base stations 102, the orientation of the base stations 102, and configuration parameters related to beams produced by the base stations, such as the directional SS Blocks, e.g., a mapping of beam identifiers to spatial angles (azimuth and elevation angles) relative to the base stations.

At stage 4, the base station 102 may send an Information Response message to the location server 172 that includes the requested location related information, such as positions, orientations, and signal characteristics, beam angles, and other configuration information for each SS Block supported by the base stations, such as mapping of beam identifiers to spatial angles (azimuth and elevation angles) relative to the base stations. The base station 102 may provide the array gain distribution variation as a function of angle and frequency over the allocated frequencies for the base station. As the array gain distribution variation is due to fixed inter-antenna element spacings in the antenna array for an entire frequency allocation, as well as effects of the antenna array housing (back plane made of plastic or metal, side bezel, etc.), etc., the array gain distribution variation is at least semi-persistent. The base station 102 and location server 172 communications, typically does not suffer from overhead limitations found in communications with the UE 104, and thus, the base station 102 may provide the array gain distribution variation over the full allocated frequencies for the base station, and need not limit the array gain distribution variation to a limited number of sub-bands or an aggregation of sub-bands.

At stage 5, the location server 172 may generate assistance data for the UE 104, e.g., based on the information response from the base station 102 and the UE 104 capabilities. For example, the location server 172 may generate assistance data that includes an array gain distribution variation as a function of angle and frequency for the set of beam weights used for beamforming by the base station 102 that may be provided as a single sub-band of the allocated bandwidth for the base station, or as an aggregation of array gain distribution variation for a plurality of sub-bands, or as separate array gain distribution variations for a plurality of sub-bands, e.g., as discussed in reference to FIGS. 9A, 9B, and 9C. The assistance data may include additional information, such as the location the base station 102 and other beam configuration information, which may be used for receiving DL positioning signals. For example, the assistance data may include a mapping of the beam identification to a nominal angle of departure (AoD), the azimuth and elevation angles of each beam, which may be provided in reference to an absolute coordinate system, such as a global coordinate system (GCS), or may be local coordinate system (LCS), e.g., relative to the antenna orientation, and the antenna orientation may be provided. The assistance data may further include beam width information, such as one or more of the beam width, the boresight direction uncertainty, the beam width uncertainty, side lobe and/or back lobe power level, side lobe and/or back lobe power level, side lobe and/or back lobe angles, or a combination thereof. The location server 172 may generate assistance data with different types of array gain distribution variation, e.g., based on type of signaling, latency requirement, and positioning accuracy requirements, and may switch the type of array gain distribution variation sent to the UE 104 for different instances of generating and sending assistance data to the UE 104 in a positioning session or different positioning sessions.

At stage 6, the location server 172 may provide the assistance data to the UE 104. For example, by using a limited number of sub-bands for the array gain distribution variation and/or aggregating the array gain distribution variations, the assistance data may be provided in a low overhead manner despite including information for ultrawide bandwidth operation. In implementations where the UE is performing UE assisted positioning, or where positioning is based on UL positioning measurements, the array gain distribution variation need not be provided to the UE 104.

At stage 7, the location server 172 may send a provide a location information request to the UE 104, e.g., requesting DL positioning measurements (e.g., DL AD measurements) from the UE 104 and/or a position estimate based on DL positioning measurements from the UE 104 for UE assisted positioning or UE based positioning, and/or may instruct the UE 104 to transmit UL SRS signals for UL or DL+UL based positioning.

At stage 8, the location server 172 may request UL measurements (e.g., UL AoA measurements) of UE transmitted SRS signals from one or more base stations if UL measurements are desired.

At stage 9, the base station 102 may transmit DL reference signals, such as PRS, e.g., using beamforming over ultrawide bandwidths, which may be received by the UE 104 if DL positioning measurements are requested.

At stage 10, the UE 104 may transmit UL reference signals, e.g., SRS signals, which may be received by one or more base stations 102 using beamforming over ultra-wide bandwidths, if UL positioning measurements are requested.

At stage 11a, the UE 104 may generate angle related position measurements from the DL reference signals if received at stage 9. For example, the UE 104 may determine which of the beams from the base station 102 is the best beam, e.g., by monitoring the received signal strength of each beam, where the beam with the greatest signal strength is considered to be the best beam and may measure the RSRP of the beam.

At stage 11b, the base station 102 may generate angle related position measurements for the UL reference signals if received at stage 10.

At optional stage 12, if UE based positioning was requested and the UE 104 received the array gain distribution variation, e.g., in stage 6, the UE 104 may determine the DL AoD measurements. For example, the UE 104 may adjust the DL AoD of the measured DL beam based on the array gain distribution variation received at stage 6.

For example, the UE 104 may determine a nominal AoD of the DL beam received at stage 11a, e.g., based on the assistance data at stage 6, and based on the frequency of the DL beam and the nominal AoD, the corresponding frequency and angle in the array gain distribution variation may be used to correct the nominal AoD to a more accurate AoD. By way of example, the array gain distribution variation may indicate that at the frequency of the DL beam and the determined AoD for the DL beam (from the assistance data), the AoD should be decreased (or increased) by a specific amount. The UE 104 may further generate a position estimate based on the determined AoD for the received beam and RSRP measured at stage 11a, and a position of the UE received in the assistance data at stage 6.

At stage 13, the UE 104 may send a provide location information response message to the location server 172, which may include the position measurements generated at stage 11a, which may be an identification of the received beam, or a determined DL AoD if generated in stage 12, and may additionally or alternatively include a position estimate if determined at stage 12.

At stage 14, the base station 102 may provide measured location information to the location server 172 determined at stage 11b, if any.

At stage 15, the location server 172 may determine the UE location based on the received location information. For example, the location server 172 may determine the DL AoD and/or UL AoA based on the identified transmit and/or receive beams and an adjustment of the beam angle as a function of angle and frequency based on the array gain distribution variation received at stage 2. For example, the location server 172 may determine a nominal DL AoD of the DL beam received by the UE 104 as reported at stage 13 and based on the frequency of the DL beam and the nominal AoD, the corresponding frequency and angle in the array gain distribution variation may be used to correct the nominal AoD to a more accurate AoD. Similarly, the location server 172 may determine a nominal UL AoA of the UL beam received by the base station 102 as reported at stage 14 and based on the frequency of the UL beam and the nominal AoA, the corresponding frequency and angle in the array gain distribution variation for the base station may be used to correct the nominal AoA to a more accurate AoA. By way of example, the array gain distribution variation may indicate that at the frequency of the beam and the measured AoD or AoA for the beam, the measured AoD or AoA should be decreased (or increased) by a specific amount. The location server 172 may determine the position of the UE 104 based on the determined DL AoD and/or UL AoA and the known position of the base station 102. The location server 172 may provide the UE 104 location to a requesting entity.

Figure 11:
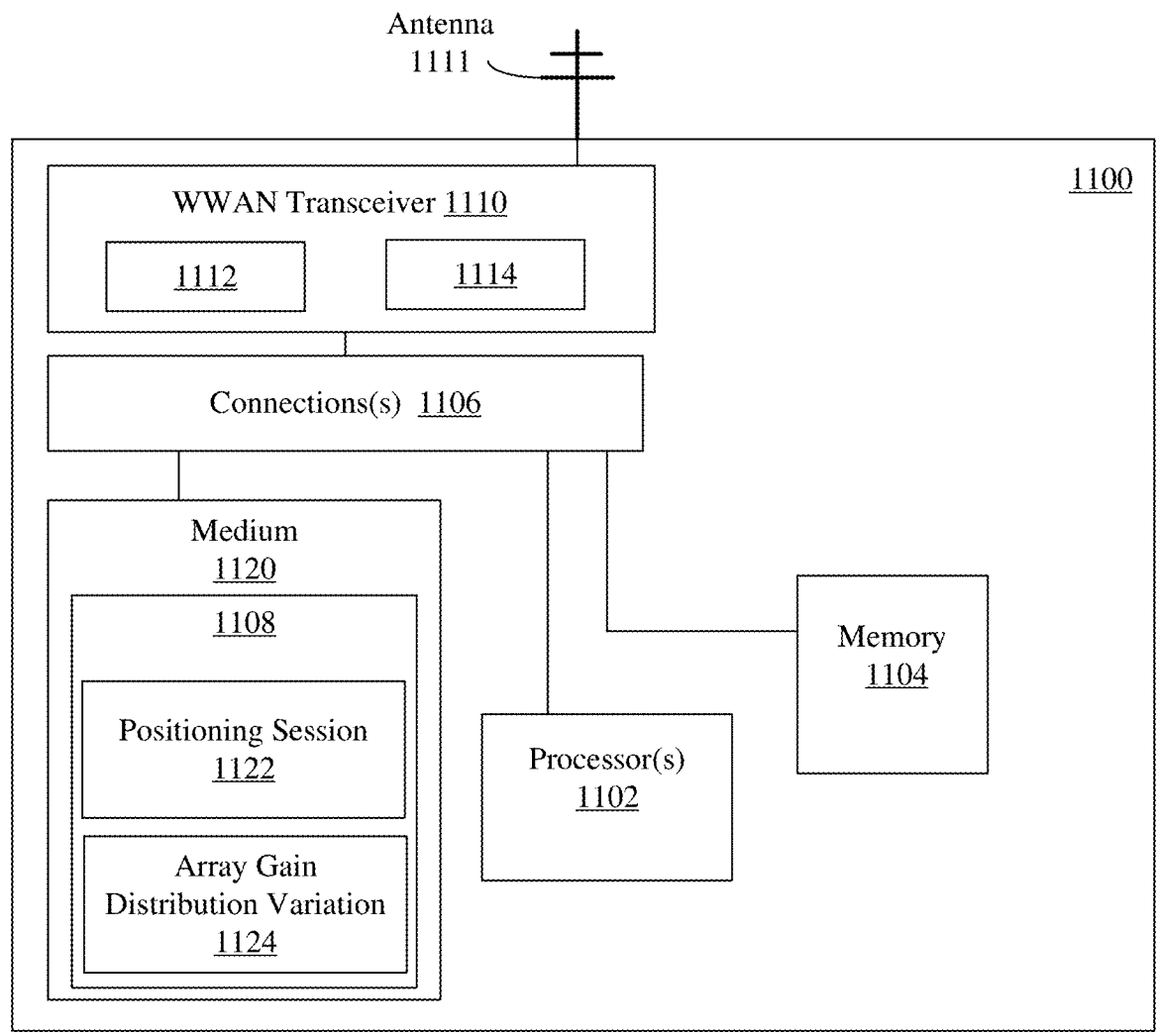
FIG. 11 shows a schematic block diagram illustrating certain exemplary features of a UE enabled to support positioning using an array gain distribution variation as a function of angle and frequency.

FIG. 11 shows a schematic block diagram illustrating certain exemplary features of a UE 1100, e.g., which may be UE 104 shown in FIG. 1, enabled to support positioning using beams transmitted with ultra-wide bandwidths and assistance data that includes array gain distribution variation as a function of angle and frequency for the set of beam weights used for beamforming by the base station, as described herein. The UE 1100 may perform the process flow shown in FIG. 14 and algorithms described herein. UE 1100 may, for example, include one or more processors 1102, memory 1104, an external interface such as a transceiver 1110 (e.g., wireless network interface), which may be operatively coupled with one or more connections 1106 (e.g., buses, lines, fibers, links, etc.) to non-transitory computer readable medium 1120 and memory 1104. The UE 1100 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 1100 may take the form of a chipset, and/or the like. Transceiver 1110 may, for example, include a transmitter 1112 enabled to transmit one or more signals over one or more types of wireless communication networks and a receiver 1114 to receive one or more signals transmitted over the one or more types of wireless communication networks.

In some embodiments, UE 1100 may include antenna 1111, which may be internal or external. UE antenna 1111 may be used to transmit and/or receive signals processed by transceiver 1110. In some embodiments, UE antenna 1111 may be coupled to transceiver 1110. The antenna 1111 may include more than one antenna element, and may be capable of dual polarization, MIMO-capable, beam forming, beam steering, and beam tracking. In some implementations, the antenna 1111 may include a plurality of panels, and each panel may include a multiple antenna array elements. In some embodiments, measurements of signals received (transmitted) by UE 1100 may be performed at the point of connection of the UE antenna 1111 and transceiver 1110. For example, the measurement point of reference for received (transmitted) RF signal measurements may be an input (output) terminal of the receiver 1114 (transmitter 1112) and an output (input) terminal of the UE antenna 1111. In a UE 1100 with multiple UE antennas 1111 or antenna arrays, the antenna connector may be viewed as a virtual point representing the aggregate output (input) of multiple UE antennas. In some embodiments, UE 1100 may measure received signals including signal strength and TOA measurements and the raw measurements may be processed by the one or more processors 1102. For example, the UE 104 may measure the received signal strength of each transmitted beam to determine the best beam received by the UE 104. For example, the transmitted beam with the highest received signal strength relative to the other beams may be treated as the best beam, i.e., the beam that is directed towards the UE 104. The UE 104 may use an antenna array to beamform receive beams, which may similarly be used to determine the best beam, e.g., using beam latching or RxTx pairing. The use of receive beams may additionally provide information related to the angle of arrival of the transmitted beam, e.g., based on the angle of the best receive beam with respect to the UE antenna array. The angle of arrival of the transmitted beam (which has a defined direction) may be used to determine the orientation of the UE 1100.

The one or more processors 1102 may be implemented using a combination of hardware, firmware, and software.

For example, the one or more processors 1102 may be configured to perform the functions discussed herein by implementing one or more instructions or program code 1108 on a non-transitory computer readable medium, such as medium 1120 and/or memory 1104. In some embodiments, the one or more processors 1102 may represent one or more circuits configurable to perform at least a portion of a data signal computing procedure or process related to the operation of UE 1100.

The medium 1120 and/or memory 1104 may store instructions or program code 1108 that contain executable code or software instructions that when executed by the one or more processors 1102 cause the one or more processors 1102 to operate as a special purpose computer programmed to perform the techniques disclosed herein. As illustrated in UE 1100, the medium 1120 and/or memory 1104 may include one or more components or modules that may be implemented by the one or more processors 1102 to perform the methodologies described herein. While the components or modules are illustrated as software in medium 1120 that is executable by the one or more processors 1102, it should be understood that the components or modules may be stored in memory 1104 or may be dedicated hardware either in the one or more processors 1102 or off the processors. A number of software modules and data tables may reside in the medium 1120 and/or memory 1104 and be utilized by the one or more processors 1102 in order to manage both communications and the functionality described herein. It should be appreciated that the organization of the contents of the medium 1120 and/or memory 1104 as shown in UE 1100 is merely exemplary, and as such the functionality of the modules and/or data structures may be combined, separated, and/or be structured in different ways depending upon the implementation of the UE 1100.

The medium 1120 and/or memory 1104 may include a positioning session module 1122 that when implemented by the one or more processors 1102 configures the one or more processors 1102 to engage in a positioning session with a location server through a serving base station, via the wireless transceiver 1110, including receiving a request for capability information and sending a response for capability information, receiving assistance data, receiving a request to provide location information, performing positioning measurements by receiving and measuring DL reference signals, transmitting UL references signals, estimating a position, sending a provide location information response, which may include positioning measurements and/or a position estimate. As described herein, the one or more processors 1102, for example, may be configured to send, via the transceiver 1110, capability information such as the ability to communicate and use assistance data comprising frequency variation of array gain for the beam weights used by the at least one base station, as well as parameters that may be relevant thereto, such as a data rate, capability, and active bandwidth part size. The one or more processors 1102, for example, may be configured to receive, via the transceiver 1110, assistance data for positioning, which may include array gain distribution variation as a function of angle and frequency for a set of beam weights used in beamforming by at least one base station. The one or more processors 1102 may be configured to receive, via the transceiver 1110, DL reference signals, and to perform at angle based positioning measurements, such as measuring a received beam, such as DL AoD based on the best received beam, as well as measure the RSRP. The one or more processors 1102 may be further configured to determine a position estimate using the position measurements as well as known locations of the base station(s), as received in assistance data, e.g., using AoD techniques, as described herein. The one or more processors 1102 may be further configured send, via the transceiver, the position information, e.g., measurements, DL AOD measurements, and/or position estimate to a network node, such as a location server.

The medium 1120 and/or memory 1104 may include an array gain distribution variation module 1124 that when implemented by the one or more processors 1102 configures the one or more processors 1102 to receive array gain distribution variation as a function of angle and frequency for a set of beam weights used in beamforming by at least one base station within the assistance data. The one or more processors 1102 may be configured to correct the DL AOD measurements using the array gain distribution variation, e.g., by correcting the measurement as a function of angle and frequency.

The methodologies described herein may be implemented by various means depending upon the application. For example, these methodologies may be implemented in hardware, firmware, software, or any combination thereof. For a hardware implementation, the one or more processors 1102 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1120 or memory 1104 that is connected to and executed by the one or more processors 1102. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1108 on a non-transitory computer readable medium, such as medium 1120 and/or memory 1104. Examples include computer readable media encoded with a data structure and computer readable media encoded with a computer program 1108. For example, the non-transitory computer readable medium including program code 1108 stored thereon may include program code 1108 to support positioning using array gain distribution variation as a function of angle and frequency in a manner consistent with disclosed embodiments. Non-transitory computer readable medium 1120 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1108 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1120, instructions and/or data may be provided as signals on transmission media included in a communication apparatus. For example, a communication apparatus may include a transceiver 1110 having signals indicative of instructions and data. The instructions and data are configured to cause one or more processors to implement the functions outlined in the claims. That is, the communication apparatus includes transmission media with signals indicative of information to perform disclosed functions.

Memory 1104 may represent any data storage mechanism. Memory 1104 may include, for example, a primary memory and/or a secondary memory. Primary memory may include, for example, a random access memory, read only memory, etc. While illustrated in this example as being separate from one or more processors 1102, it should be understood that all or part of a primary memory may be provided within or otherwise co-located/coupled with the one or more processors 1102. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1120. As such, in certain example implementations, the methods and/or apparatuses presented herein may take the form in whole or part of a computer readable medium 1120 that may include computer implementable code 1108 stored thereon, which if executed by one or more processors 1102 may be operatively enabled to perform all or portions of the example operations as described herein. Computer readable medium 1120 may be a part of memory 1104.

Figure 12:
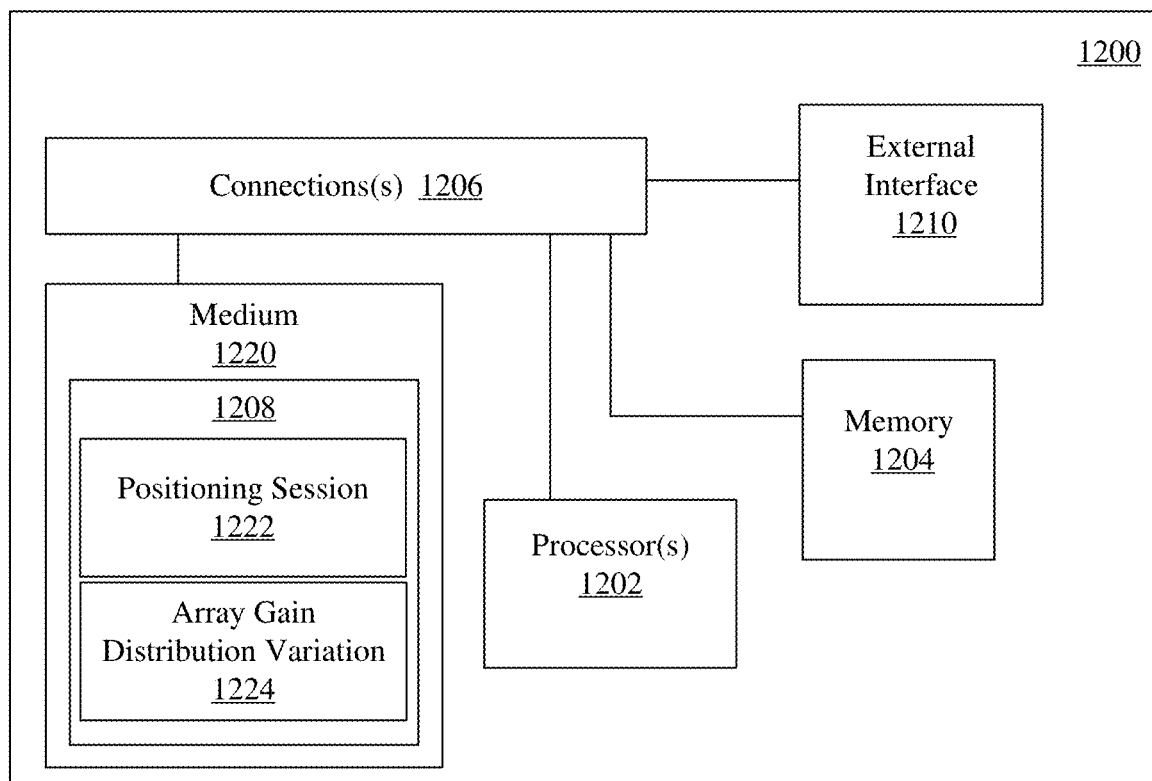
FIG. 12 shows a schematic block diagram illustrating certain exemplary features of a location server enabled to support positioning of a UE using an array gain distribution variation as a function of angle and frequency.

FIG. 12 shows a schematic block diagram illustrating certain exemplary features of a location server 1200, e.g., location server 172, enabled to support positioning of a UE using array gain distribution variation as a function of angle and frequency for the set of beam weights used for beamforming by the base station, as described herein. The location server 1200 may be, e.g., a E-SMLC, SLP, LMF, LSS, etc. The location server 1200 may perform the process flow shown in FIGS. 15 and 16 and algorithms described herein. Location server 1200 may, for example, include one or more processors 1202, memory 1204, and an external interface 1210 (e.g., wireline or wireless network interface to other network entities, such as core network entities and base stations), which may be operatively coupled with one or more connections 1206 (e.g., buses, lines, fibers, links, etc.) to non-transitory computer readable medium 1220 and memory 1204. The base station 1200 may further include additional items, which are not shown, such as a user interface that may include e.g., a display, a keypad or other input device, such as virtual keypad on the display, through which a user may interface with the location server. In certain example implementations, all or part of location server 1200 may take the form of a chipset, and/or the like. The external interface 1210 may be a wired or wireless interface capable of connecting to base stations in the RAN or network entities, such as an AMF, MME, or UPF.

The one or more processors 1202 may be implemented using a combination of hardware, firmware, and software.

For example, the one or more processors 1202 may be configured to perform the functions discussed herein by implementing one or more instructions or program code 1208 on a non-transitory computer readable medium, such as medium 1220 and/or memory 1204. In some embodiments, the one or more processors 1202 may represent one or more circuits configurable to perform at least a portion of a data signal computing procedure or process related to the operation of location server 1200.

The medium 1220 and/or memory 1204 may store instructions or program code 1208 that contain executable code or software instructions that when executed by the one or more processors 1202 cause the one or more processors 1202 to operate as a special purpose computer programmed to perform the techniques disclosed herein. As illustrated in location server 1200, the medium 1220 and/or memory 1204 may include one or more components or modules that may be implemented by the one or more processors 1202 to perform the methodologies described herein. While the components or modules are illustrated as software in medium 1220 that is executable by the one or more processors 1202, it should be understood that the components or modules may be stored in memory 1204 or may be dedicated hardware either in the one or more processors 1202 or off the processors. A number of software modules and data tables may reside in the medium 1220 and/or memory 1204 and be utilized by the one or more processors 1202 in order to manage both communications and the functionality described herein. It should be appreciated that the organization of the contents of the medium 1220 and/or memory 1204 as shown in location server 1200 is merely exemplary, and as such the functionality of the modules and/or data structures may be combined, separated, and/or be structured in different ways depending upon the implementation of the location server 1200.

The medium 1220 and/or memory 1204 may include a positioning session module 1222 that when implemented by the one or more processors 1202 configures the one or more processors 1202 to engage in a positioning session with a UE through a serving base station, via the external interface 1210, including sending a request for capability information and receiving a response for capability information, generating and sending assistance data, sending a request to provide location information, receiving a provide location information response from the UE, receiving position measurements from base stations, estimating a position of the UE. As described herein, the one or more processors 1202, for example, may be configured to receive, via the external interface 1210, capability information from the UE, such as the ability of the UE to communicate and use assistance data comprising frequency variation of array gain for the beam weights used by the at least one base station, as well as parameters that may be relevant thereto, such as a data rate, capability, and active bandwidth part size. The one or more processors 1202, for example, may be configured to receive, via the external interface 1210, base station configuration information including, e.g., an array gain distribution variation as a function of angle and frequency for a set of beam weights used in beamforming by at least one base station. The one or more processors 1202, for example, may be configured to generate assistance data based on the base station configuration information and may include different types of array gain distribution variation as a function of angle and frequency for a set of beam weights used in beamforming by at least one base station, e.g., based on the UE parameters, such as data rate, capabilities, and active bandwidth part size, and based e.g., type of signaling, latency requirement, and positioning accuracy requirement, as described herein. The one or more processors 1202 may be further configured to send, via external interface 1210, the assistance data to a UE, which may include array gain distribution variation as a function of angle and frequency for a set of beam weights used in beamforming by at least one base station. The one or more processors 1202 may be configured to receive, via the external interface 1210, position information from the UE, such as angle based measurements or position estimate, and position measurements from one or more base stations. The one or more processors 1202 may be configured to determine AoD and/or AoA measurements from the received measurement information and the base station configuration information. The one or more processors 1202 may be further configured to determine a position estimate using the position measurements, e.g., AoD and AoA measurements, as well as known locations of the base station(s).

The medium 1220 and/or memory 1204 may include an array gain distribution variation module 1224 that when implemented by the one or more processors 1202 configures the one or more processors 1202 to receive array gain distribution variation as a function of angle and frequency for a set of beam weights used in beamforming by at least one base station, e.g., from one or more base stations. The one or more processors 1202 may be configured to correct the DL AOD or UL AOA measurements using the array gain distribution variation, e.g., by correcting the measurement as a function of angle and frequency.

The methodologies described herein may be implemented by various means depending upon the application. For example, these methodologies may be implemented in hardware, firmware, software, or any combination thereof. For a hardware implementation, the one or more processors 1202 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1220 or memory 1204 that is connected to and executed by the one or more processors 1202. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1208 on a non-transitory computer readable medium, such as medium 1220 and/or memory 1204. Examples include computer readable media encoded with a data structure and computer readable media encoded with a computer program 1208. For example, the non-transitory computer readable medium including program code 1208 stored thereon may include program code 1208 to support positioning of UE using array gain distribution variation as a function of angle and frequency for the set of beam weights used for beamforming by the base station in a manner consistent with disclosed embodiments. Non-transitory computer readable medium 1220 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1208 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1220, instructions and/or data may be provided as signals on transmission media included in a communication apparatus. For example, a communication apparatus may include a communications interface 1210 having signals indicative of instructions and data. The instructions and data are configured to cause one or more processors to implement the functions outlined in the claims. That is, the communication apparatus includes transmission media with signals indicative of information to perform disclosed functions.

Memory 1204 may represent any data storage mechanism. Memory 1204 may include, for example, a primary memory and/or a secondary memory. Primary memory may include, for example, a random access memory, read only memory, etc. While illustrated in this example as being separate from one or more processors 1202, it should be understood that all or part of a primary memory may be provided within or otherwise co-located/coupled with the one or more processors 1202. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1220. As such, in certain example implementations, the methods and/or apparatuses presented herein may take the form in whole or part of a computer readable medium 1220 that may include computer implementable code 1208 stored thereon, which if executed by one or more processors 1202 may be operatively enabled to perform all or portions of the example operations as described herein. Computer readable medium 1220 may be a part of memory 1204.

Figure 13:
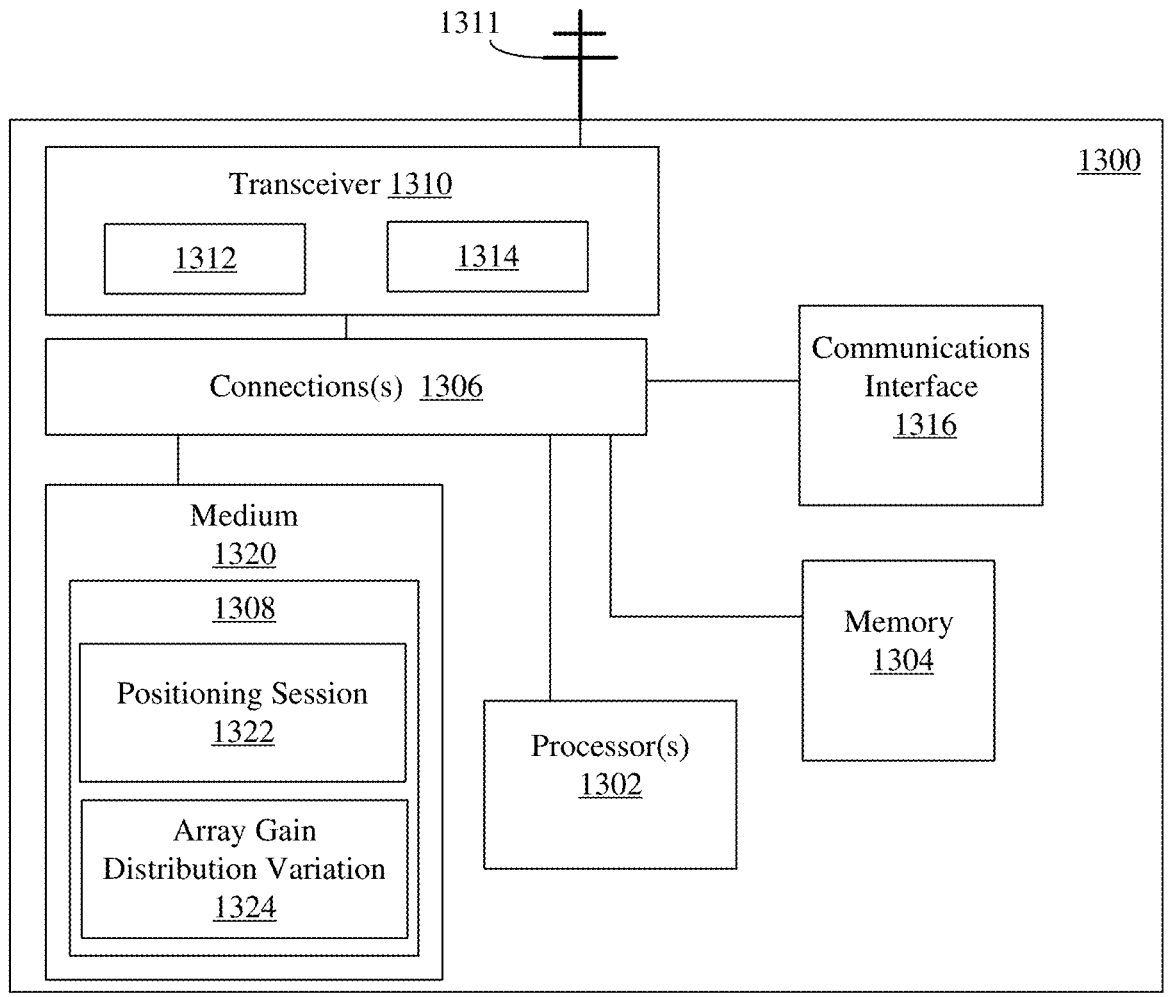
FIG. 13 shows a schematic block diagram illustrating certain exemplary features of a base station enabled to support positioning of a UE using an array gain distribution variation as a function of angle and frequency.

FIG. 13 shows a schematic block diagram illustrating certain exemplary features of a base station 1300, e.g., gNB 102 in FIG. 1, enabled to support positioning of a UE USING array gain distribution variation as a function of angle and frequency for the set of beam weights used for beamforming, as described herein. The base station 1300 may be an eNB or gNB. The base station 1300 may perform the process flow, shown in FIG. 17 and algorithms described herein. Base station 1300 may, for example, include one or more processors 1302, memory 1304, an external interface, which may include a transceiver 1310 (e.g., wireless network interface) and a communications interface 1316 (e.g., wireline or wireless network interface to other base stations and/or entities in the core network such as a location server directly or via one or more intervening entities), which may be operatively coupled with one or more connections 1306 (e.g., buses, lines, fibers, links, etc.) to non-transitory computer readable medium 1320 and memory 1304. The base station 1300 may further include additional items, which are not shown, such as a user interface that may include e.g., a display, a keypad or other input device, such as virtual keypad on the display, through which a user may interface with the base station. In certain example implementations, all or part of base station 1300 may take the form of a chipset, and/or the like. Transceiver 1310 may, for example, include a transmitter 1312 enabled to transmit one or more signals over one or more types of wireless communication networks and a receiver 1314 to receive one or more signals transmitted over the one or more types of wireless communication networks. The communications interface 1316 may be a wired or wireless interface capable of connecting to other base stations in the RAN or network entities, such as a location server, e.g., LMF 152, SLP 162, ESMLC, LSS, etc. through various entities such as AMF 154 or UPF 158, shown in FIG. 1.

In some embodiments, base station 1300 may include antenna 1311, which may be internal or external. Antenna 1311 may be used to transmit and/or receive signals processed by transceiver 1310. In some embodiments, antenna 1311 may be coupled to transceiver 1310. In some embodiments, measurements of signals received (transmitted) by base station 1300 may be performed at the point of connection of the antenna 1311 and transceiver 1310. For example, the measurement point of reference for received (transmitted) RF signal measurements may be an input (output) terminal of the receiver 1314 (transmitter 1312) and an output (input) terminal of the antenna 1311. In a base station 1300 with multiple antennas 1311 or antenna arrays, the antenna connector may be viewed as a virtual point representing the aggregate output (input) of multiple antennas. The antennas 1311, for example, is one or more antenna arrays capable of beamforming using beam weights over ultra-wide bandwidth to generate transmit (Tx) beams and/or receive (Rx) beams. In some embodiments, base station 1300 may measure received signals including signal strength and TOA measurements and the raw measurements may be processed by the one or more processors 1302.

The one or more processors 1302 may be implemented using a combination of hardware, firmware, and software. For example, the one or more processors 1302 may be configured to perform the functions discussed herein by implementing one or more instructions or program code 1308 on a non-transitory computer readable medium, such as medium 1320 and/or memory 1304. In some embodiments, the one or more processors 1302 may represent one or more circuits configurable to perform at least a portion of a data signal computing procedure or process related to the operation of base station 1300.

The medium 1320 and/or memory 1304 may store instructions or program code 1308 that contain executable code or software instructions that when executed by the one or more processors 1302 cause the one or more processors 1302 to operate as a special purpose computer programmed to perform the techniques disclosed herein. As illustrated in base station 1300, the medium 1320 and/or memory 1304 may include one or more components or modules that may be implemented by the one or more processors 1302 to perform the methodologies described herein. While the components or modules are illustrated as software in medium 1320 that is executable by the one or more processors 1302, it should be understood that the components or modules may be stored in memory 1304 or may be dedicated hardware either in the one or more processors 1302 or off the processors. A number of software modules and data tables may reside in the medium 1320 and/or memory 1304 and be utilized by the one or more processors 1302 in order to manage both communications and the functionality described herein. It should be appreciated that the organization of the contents of the medium 1320 and/or memory 1304 as shown in base station 1300 is merely exemplary, and as such the functionality of the modules and/or data structures may be combined, separated, and/or be structured in different ways depending upon the implementation of the base station 1300.

The medium 1320 and/or memory 1304 may include a positioning session module 1322 that when implemented by the one or more processors 1302 configures the one or more processors 1302 to engage in a positioning session with a UE and a location server, via the external interface (transceiver 1310 and communications interface 1316). For example, the one or more processors 1302 may be configured to pass LPP positioning messages between the UE and location server via the external interface. The one or more processors 1302 may be further configured to provide base station configuration information to the location server, via the communications interface 1316, including beam related information, such as array gain distribution variation as a function of angle and frequency for at least one set of beam weights used in beamforming used by the base station. The one or more processors 1302 may be further configured to cause the transceiver 1310 to transmit DL reference signals to the UE and to receive UL reference signals from the UE, e.g., using transmit (Tx) and receive (Rx) beams, produced via beamforming. The one or more processors 1302 may be configured to measure the UL reference signals and to provide measurement information to a location server.

The medium 1320 and/or memory 1304 may include an array gain distribution variation module 1324 that when implemented by the one or more processors 1302 configures the one or more processors 1302 to obtain array gain distribution variation as a function of angle and frequency for a set of beam weights used in beamforming, which may be stored in memory or may be determined based on current antenna array configuration and beam weights used in beamforming.

The methodologies described herein may be implemented by various means depending upon the application. For example, these methodologies may be implemented in hardware, firmware, software, or any combination thereof. For a hardware implementation, the one or more processors 1302 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 1320 or memory 1304 that is connected to and executed by the one or more processors 1302. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 1308 on a non-transitory computer readable medium, such as medium 1320 and/or memory 1304. Examples include computer readable media encoded with a data structure and computer readable media encoded with a computer program 1308. For example, the non-transitory computer readable medium including program code 1308 stored thereon may include program code 1308 to support positioning of a UE using array gain distribution variation as a function of angle and frequency for the set of beam weights used for beamforming by the base station in a manner consistent with disclosed embodiments. Non-transitory computer readable medium 1320 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 1308 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 1320, instructions and/or data may be provided as signals on transmission media included in a communication apparatus. For example, a communication apparatus may include a transceiver 1310 having signals indicative of instructions and data. The instructions and data are configured to cause one or more processors to implement the functions outlined in the claims. That is, the communication apparatus includes transmission media with signals indicative of information to perform disclosed functions.

Memory 1304 may represent any data storage mechanism. Memory 1304 may include, for example, a primary memory and/or a secondary memory. Primary memory may include, for example, a random access memory, read only memory, etc. While illustrated in this example as being separate from one or more processors 1302, it should be understood that all or part of a primary memory may be provided within or otherwise co-located/coupled with the one or more processors 1302. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 1320. As such, in certain example implementations, the methods and/or apparatuses presented herein may take the form in whole or part of a computer readable medium 1320 that may include computer implementable code 1308 stored thereon, which if executed by one or more processors 1302 may be operatively enabled to perform all or portions of the example operations as described herein. Computer readable medium 1320 may be a part of memory 1304.

Figure 14:
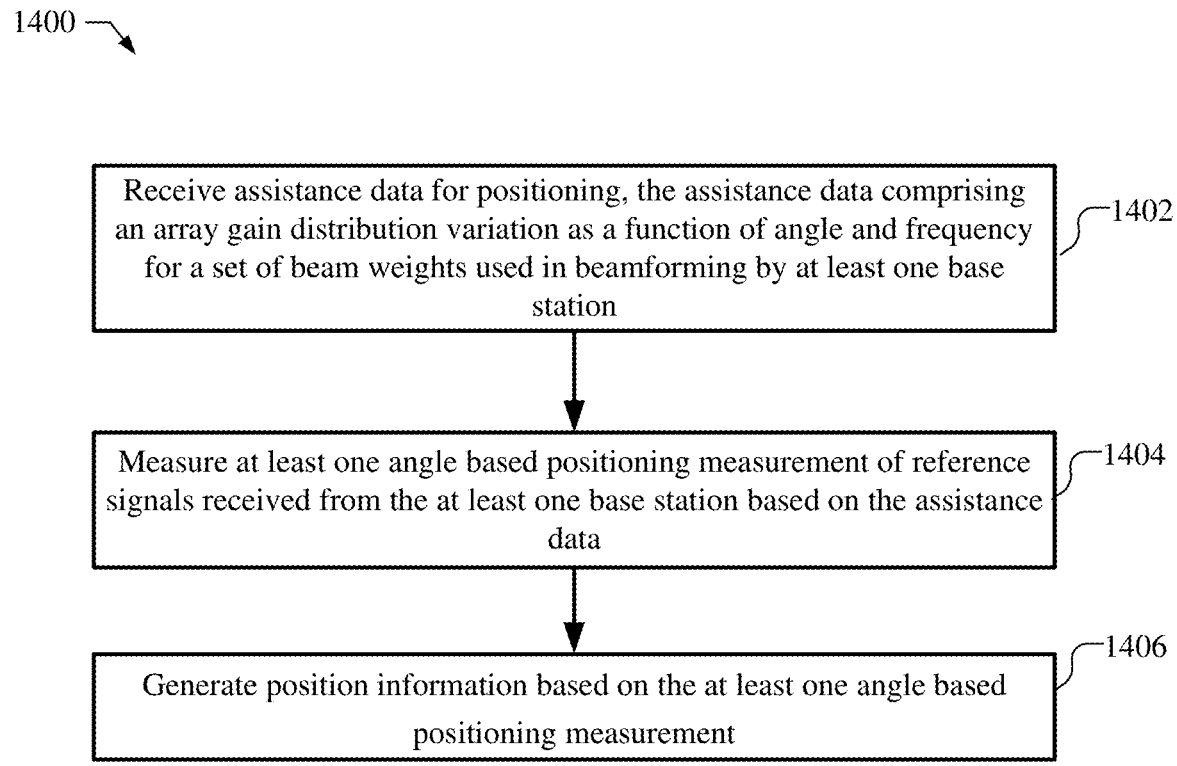
FIG. 14 shows a flowchart for an exemplary method for determining a location of a mobile device performed by the mobile device.

FIG. 14 shows a flowchart for an exemplary method 1400 for supporting positioning of a mobile device in a wireless network performed by the mobile device, such as UE 104, in a manner consistent with disclosed implementation.

At block 1402, the mobile device receives assistance data for positioning, the assistance data comprising an array gain distribution variation as a function of angle and frequency for a set of beam weights used in beamforming by at least one base station, e.g., as discussed in stages 5 and 6 of FIG. 10, and FIGS. 9A, 9b, and 9C. A means for receiving assistance data for positioning, the assistance data comprising an array gain distribution variation as a function of angle and frequency for a set of beam weights used in beamforming by at least one base station may include, e.g., the wireless transceiver 1110 and one or more processors 1102 with dedicated hardware or implementing executable code or software instructions in memory 1104 and/or medium 1120 such as the positioning session module 1122 and the array gain distribution variation module 1124 in UE 1100 shown in FIG. 11.

At block 1404, the mobile device measures at least one angle based positioning measurement of reference signals received from the at least one base station based on the assistance data; and, e.g., as discussed in stages 9 and 11a of FIG. 10. For example, the at least one angle based positioning measurement may be at least one downlink Angle of Departure (AoD) measurement. A means for measuring at least one angle based positioning measurement of reference signals received from the at least one base station based on the assistance data may include, e.g., the wireless transceiver 1110 and one or more processors 1102 with dedicated hardware or implementing executable code or software instructions in memory 1104 and/or medium 1120 such as the positioning session module 1122 in UE 1100 shown in FIG. 11.

At block 1406, the mobile device generates position information based on the at least one angle based positioning measurement, e.g., as discussed in stages 11a, 12, and 13 of FIG. 10. A means for generating position information based on the at least one angle based positioning measurement may include, e.g., the wireless transceiver 1110 and one or more processors 1102 with dedicated hardware or implementing executable code or software instructions in memory 1104 and/or medium 1120 such as the positioning session module 1122 and the array gain distribution variation module 1124 in UE 1100 shown in FIG. 11.

In one implementation, a variation in array gain distribution described by the array gain distribution variation in the assistance data is due to the use of fixed inter-antenna element spacings in an antenna array for an entire frequency allocation by the at least one base station. The array gain distribution variation may include frequency and spatial distortions and impairments in an array gain response. The array gain distribution variation may correspond to gain and direction information of at least one of a main lobe, side lobes, beam nulls, and grating lobes.

In one implementation, mobile device may measure the at least one angle based positioning measurement of reference signals received from the at least one base station by determining at least one downlink (DL) Angle of Departure (AOD) measurement for at least one positioning reference signal transmitted by the at least one base station based on the array gain distribution variation for the set of beam weights used in beamforming by the at least one base station, e.g., as discussed in stages 11a, 12, and 13 of FIG. 10. A means for determining at least one downlink (DL) Angle of Departure (AOD) measurement for at least one positioning reference signal transmitted by the at least one base station based on the array gain distribution variation for the set of beam weights used in beamforming by the at least one base station may include, e.g., the wireless transceiver 1110 and one or more processors 1102 with dedicated hardware or implementing executable code or software instructions in memory 1104 and/or medium 1120 such as the positioning session module 1122 and the array gain distribution variation module 1124 in UE 1100 shown in FIG. 11.

The position information may comprise one of the at least one angle based positioning measurement, a position estimate determined based on the at least one angle based positioning measurement, and a combination thereof. The mobile device may send the position information to a network node, e.g., as discussed in stage 13 of FIG. 10. For example, the network node may be a base station or a location server, which may be, e.g., one of a Location Management Function (LMF), Evolved Serving Mobile Location Center (ESMLC), Location Server Surrogate (LSS), or a serving base station. A means for sending the position information to a network node may include, e.g., the wireless transceiver 1110 and one or more processors 1102 with dedicated hardware or implementing executable code or software instructions in memory 1104 and/or medium 1120 such as the positioning session module 1122 and the array gain distribution variation module 1124 in UE 1100 shown in FIG. 11.

In one implementation, the mobile device may send capability information to a network node indicating an ability to communicate and use assistance data comprising frequency variation of array gain for the beam weights used by the at least one base station, e.g., as discussed in stage 2 of FIG. 10. A means for sending capability information to a network node indicating an ability to communicate and use assistance data comprising frequency variation of array gain for the beam weights used by the at least one base station may include, e.g., the wireless transceiver 1110 and one or more processors 1102 with dedicated hardware or implementing executable code or software instructions in memory 1104 and/or medium 1120 such as the positioning session module 1122 in UE 1100 shown in FIG. 11.

In one implementation, the array gain distribution variation for the set of beam weights used in beamforming by the at least one base station may be for a sub-band of an allocated bandwidth, e.g., as discussed in stage 5 of FIG. 10 and FIG. 9A. The size of the sub-band of the allocated bandwidth may be configured based on at least one mobile device parameter. For example, the at least one mobile device parameter may be, e.g., at least one of a data rate of the mobile device, capability of the mobile device, and active bandwidth part size in the mobile device. The size of the sub-band may be dynamically selected.

In one implementation, the array gain distribution variation for the set of beam weights used in beamforming by the at least one base station may be an aggregation of array gain distribution variations for a plurality of different sub-bands of an allocated bandwidth, e.g., as discussed in stage 5 of FIG. 10 and FIG. 9B. The plurality of different sub-bands of the allocated bandwidth may span an active bandwidth part in the mobile device. The aggregation of the array gain distribution variations for the plurality of different sub-bands of the allocated bandwidth may comprise a weighted average of the array gain distribution variations for the plurality of different sub-bands. The weights in the weighted average may correspond to sizes of the different sub-bands.

In one implementation, the array gain distribution variation for the set of beam weights used in beamforming by the at least one base station may comprise a plurality of array gain distribution variations corresponding to a plurality of different sub-bands of an allocated bandwidth, e.g., as discussed in stage 5 of FIG. 10 and FIG. 9C. The plurality of different sub-bands of the allocated bandwidth may span an active bandwidth part in the mobile device.

In one implementation, the array gain distribution variation as the function of frequency for the set of beam weights used by the at least one base station is a first type of array gain distribution variation comprising one of: a single array gain distribution variation for a sub-band of an allocated bandwidth, an aggregation of array gain distribution variations for a plurality of different sub-bands of the allocated bandwidth, and a plurality of array gain distribution variations corresponding to a plurality of different sub-bands of the allocated bandwidth, e.g., as discussed in stage 5 of FIG. 10 and FIGS. 9A, 9B, and 9C. The mobile device may receive second assistance data for positioning, the second assistance data comprising a second type of array gain distribution variation, wherein the second type is different than the first type, e.g., as discussed in stages 5 and 6 of FIG. 10. A means for receiving second assistance data for positioning, the second assistance data comprising a second type of array gain distribution variation, wherein the second type is different than the first type may include, e.g., the wireless transceiver 1110 and one or more processors 1102 with dedicated hardware or implementing executable code or software instructions in memory 1104 and/or medium 1120 such as the positioning session module 1122 and the array gain distribution variation module 1124 in UE 1100 shown in FIG. 11. The second assistance data comprising the second type of array gain distribution variation may be received based on at least one of type of signaling, latency requirement, and positioning accuracy requirement.

Figure 15:
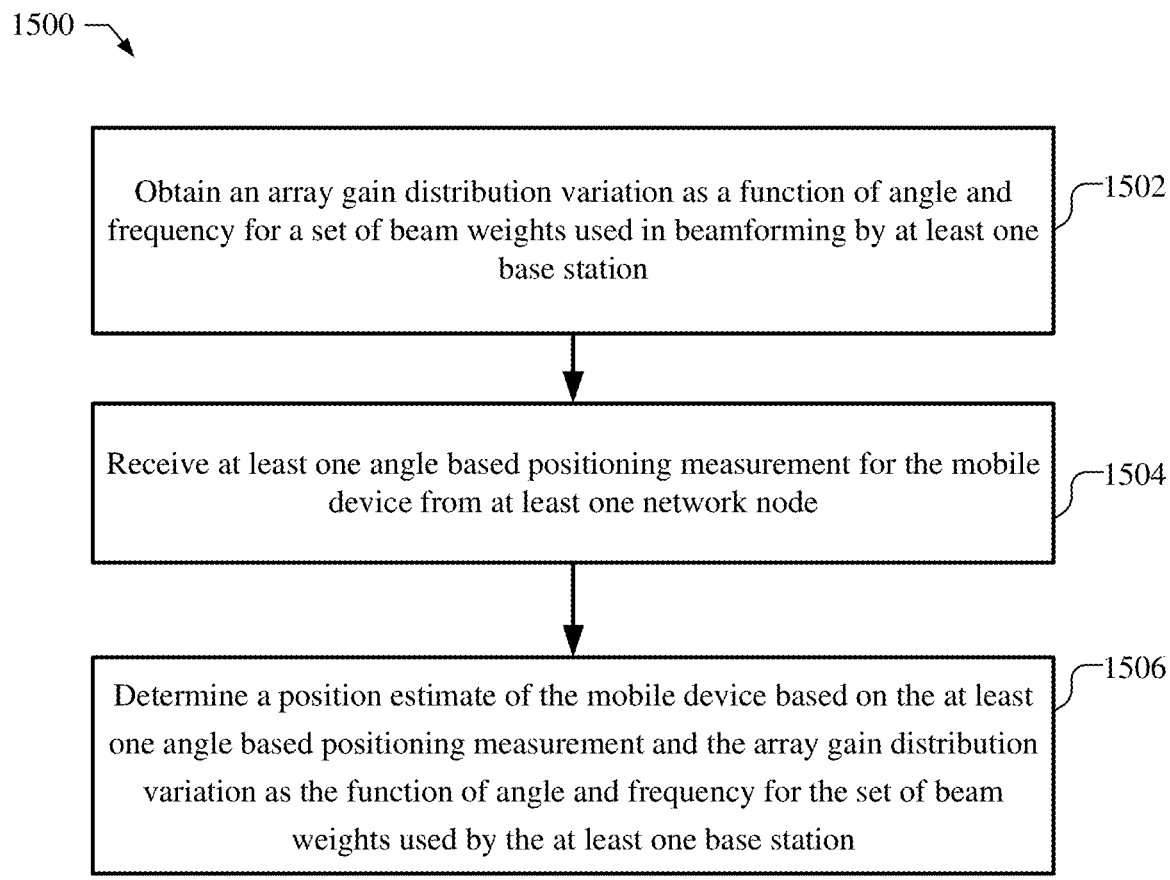
FIG. 15 shows a flowchart for an exemplary method for determining a location of a mobile device performed by a location server.

FIG. 15 shows a flowchart for an exemplary method 1500 for supporting positioning of a mobile device performed by a location server, such as location server 172, which may be an E-SMLC, SLP, LSS, LMF, or serving base station.

At block 1502, the location server obtains an array gain distribution variation as a function of angle and frequency for a set of beam weights used in beamforming by at least one base station, e.g., as discussed in stage 4 of FIG. 10. A means for obtaining an array gain distribution variation as a function of angle and frequency for a set of beam weights used in beamforming by at least one base station may include, e.g., the external interface 1210 and one or more processors 1202 with dedicated hardware or implementing executable code or software instructions in memory 1204 and/or medium 1220, such as positioning session module 1222 and the array gain distribution variation module 1224 in the location server 1200 shown in FIG. 12.

At block 1504, the location server receives at least one angle based positioning measurement for the mobile device from at least one network node, e.g., as discussed in stages 13 and 14 of FIG. 10. A means for receiving at least one angle based positioning measurement for the mobile device from at least one network node may include, e.g., the external interface 1210 and one or more processors 1202 with dedicated hardware or implementing executable code or software instructions in memory 1204 and/or medium 1220, such as positioning session module 1222 in the location server 1200 shown in FIG. 12

At block 1506, the location server determines a position estimate of the mobile device based on the at least one angle based positioning measurement and the array gain distribution variation as the function of angle and frequency for the set of beam weights used by the at least one base station, e.g., as discussed in stage 15 of FIG. 10. A means for determining a position estimate of the mobile device based on the at least one angle based positioning measurement and the array gain distribution variation as the function of angle and frequency for the set of beam weights used by the at least one base station may include, e.g., the external interface 1210 and one or more processors 1202 with dedicated hardware or implementing executable code or software instructions in memory 1204 and/or medium 1220, such as positioning session module 1222 and the array gain distribution variation module 1224 in the location server 1200 shown in FIG. 12.

In one implementation, the array gain distribution variation is due to the use of fixed inter-antenna element spacings in an antenna array for an entire frequency allocation. The array gain distribution variation may include frequency and spatial distortions and impairments in an array gain response. The array gain distribution variation may correspond to gain and direction information of at least one of a main lobe, side lobes, beam nulls, and grating lobes.

In one implementation, the at least one network node may comprise the mobile device and the array gain distribution variation is for a transmit beam pattern corresponding to the at least one set of beam weights used in beamforming by the at least one base station, e.g., as discussed at stages 2 and 13. The location server may determine the position estimate of the mobile device by determining at least one downlink (DL) Angle of Departure (AOD) measurement for the mobile device for a positioning reference signal transmitted by the at least one base station based on the at least one angle based positioning measurement received from the mobile device and the array gain distribution variation for the transmit beam pattern corresponding to the at least one set of beam weights used in beamforming by the at least one base station, e.g., as discussed in stage 15 of FIG. 10. Further, the location server may estimate the position estimate based at least in part on the DL AOD measurement, e.g., as discussed in stage 15 of FIG. 10. A means for determining the position estimate of the mobile device by determining at least one downlink (DL) Angle of Departure (AOD) measurement for the mobile device for a positioning reference signal transmitted by the at least one base station based on the at least one angle based positioning measurement received from the mobile device and the array gain distribution variation for the transmit beam pattern corresponding to the at least one set of beam weights used in beamforming by the at least one base station and a means for estimating the position estimate based at least in part on the DL AOD measurement may include, e.g., the external interface 1210 and one or more processors 1202 with dedicated hardware or implementing executable code or software instructions in memory 1204 and/or medium 1220, such as positioning session module 1222 and the array gain distribution variation module 1224 in the location server 1200 shown in FIG. 12.

In one implementation, the at least one network node may be the at least one base station and the array gain distribution variation is for a receive beam pattern corresponding to the at least one set of beam weights used in beamforming by the at least one base station, e.g., as discussed at stages 2 and 14. The location server may determine the position estimate of the mobile device by determining at least one uplink (UL) Angle of Arrival (AOA) measurement for the mobile device for a sounding reference signal transmitted by the mobile device based on the at least one angle based positioning measurement received from the at least one base station and the array gain distribution variation for the receive beam pattern corresponding to the at least one set of beam weights used in beamforming by the at least one base station, e.g., as discussed in stage 15 of FIG. 10. Further, the location server may estimate the position estimate based at least in part on the UL AOA measurement, e.g., as discussed in stage 15 of FIG. 10. A means for determining the position estimate of the mobile device by determining at least one uplink (UL) Angle of Arrival (AOA) measurement for the mobile device for a sounding reference signal transmitted by the mobile device based on the at least one angle based positioning measurement received from the at least one base station and the array gain distribution variation for the receive beam pattern corresponding to the at least one set of beam weights used in beamforming by the at least one base station and the means for estimating the position estimate based at least in part on the UL AOA measurement may include, e.g., the external interface 1210 and one or more processors 1202 with dedicated hardware or implementing executable code or software instructions in memory 1204 and/or medium 1220, such as positioning session module 1222 and the array gain distribution variation module 1224 in the location server 1200 shown in FIG. 12.

In one implementation, the array gain distribution variation for the set of beam weighs used in beamforming by the at least one base station may be for a sub-band of an allocated bandwidth, e.g., as discussed in stage 5 of FIG. 10 and FIG. 9A. The size of the sub-band of the allocated bandwidth is configured based on at least one mobile device parameter. For example, the at least one mobile device parameter may be, e.g., at least one of a data rate of the mobile device, capability of the mobile device, and active bandwidth part size in the mobile device. The size of the sub-band is dynamically selected.

In one implementation, the array gain distribution variation for the set of beam weights used in beamforming by the at least one base station may be an aggregation of array gain distribution variations for a plurality of different sub-bands of an allocated bandwidth, e.g., as discussed in stage 5 of FIG. 10 and FIG. 9B. The plurality of different sub-bands of the allocated bandwidth may span an active bandwidth part in the mobile device. The aggregation of the array gain distribution variations for the plurality of different sub-bands of the allocated bandwidth may comprise a weighted average of the array gain distribution variations for the plurality of different sub-bands. The weights in the weighted average may correspond to sizes of the different sub-bands.

In one implementation, the array gain distribution variation for the set of beam weights used in beamforming by the at least one base station may comprise a plurality of array gain distribution variations corresponding to a plurality of different sub-bands of an allocated bandwidth, e.g., as discussed in stage 5 of FIG. 10 and FIG. 9C. The plurality of different sub-bands of the allocated bandwidth may span an active bandwidth part in the mobile device.

Figure 16:
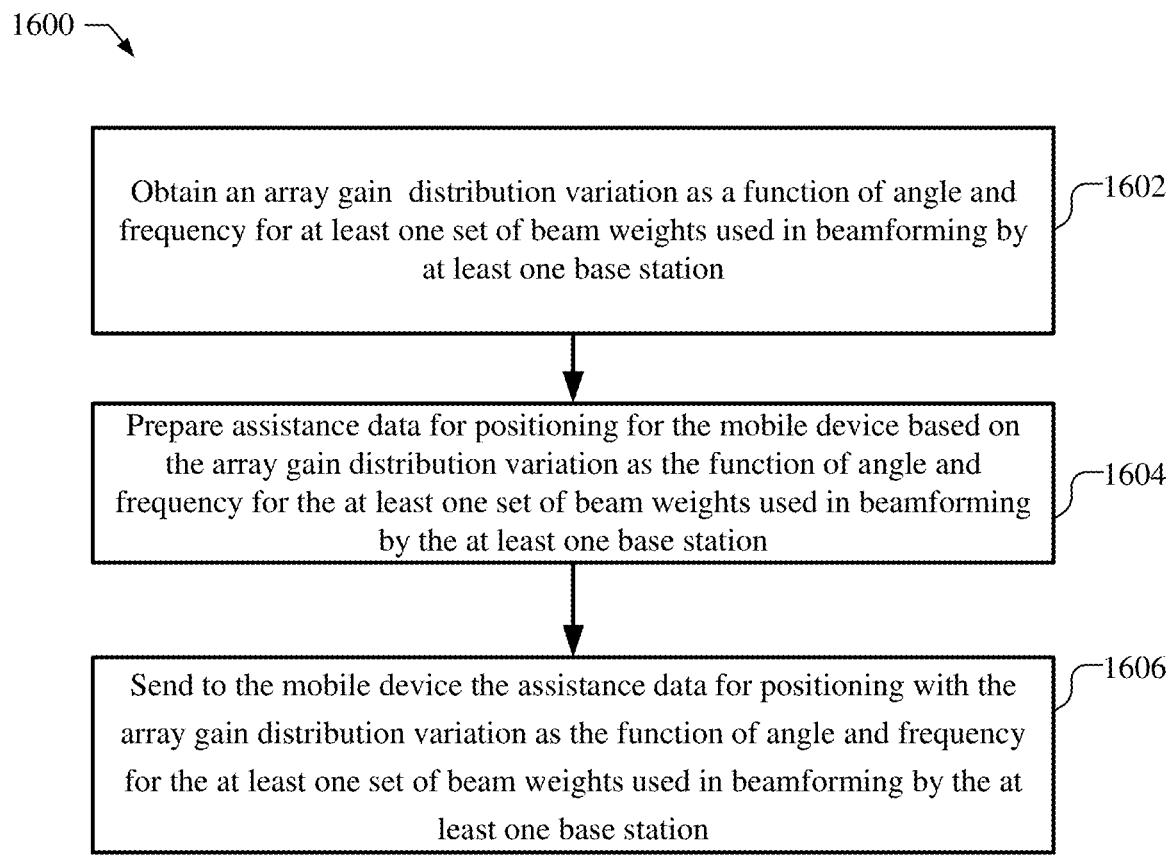
FIG. 16 shows a flowchart for another exemplary method for determining a location of a mobile device performed by a location server.

FIG. 16 shows a flowchart for an exemplary method 1600 for supporting positioning of a mobile device performed by a location server, such as location server 172, which may be an E-SMLC, SLP, LSS, LMF, or serving base station.

At block 1602, the location server obtains an array gain distribution variation as a function of angle and frequency for a set of beam weights used in beamforming by at least one base station, e.g., as discussed in stage 4 of FIG. 10. A means for obtaining an array gain distribution variation as a function of angle and frequency for a set of beam weights used in beamforming by at least one base station may include, e.g., the external interface 1210 and one or more processors 1202 with dedicated hardware or implementing executable code or software instructions in memory 1204 and/or medium 1220, such as positioning session module 1222 and the array gain distribution variation module 1224 in the location server 1200 shown in FIG. 12.

At block 1604, the location server prepares assistance data for positioning for the mobile device based on the array gain distribution variation as the function of angle and frequency for the at least one set of beam weights used in beamforming by the at least one base station, as discussed in stage 5 of FIG. 10. A means for preparing assistance data for positioning for the mobile device based on the array gain distribution variation as the function of angle and frequency for the at least one set of beam weights used in beamforming by the at least one base station may include, e.g., the external interface 1210 and one or more processors 1202 with dedicated hardware or implementing executable code or software instructions in memory 1204 and/or medium 1220, such as positioning session module 1222 and the array gain distribution variation module 1224 in the location server 1200 shown in FIG. 12.

At block 1606, the location server sends to the mobile device the assistance data for positioning with the array gain distribution variation as the function of angle and frequency for the at least one set of beam weights used in beamforming by the at least one base station, e.g., as discussed in stage 6 of FIG. 10. A means for sending to the mobile device the assistance data for positioning with the array gain distribution variation as the function of angle and frequency for the at least one set of beam weights used in beamforming by the at least one base station may include, e.g., the external interface 1210 and one or more processors 1202 with dedicated hardware or implementing executable code or software instructions in memory 1204 and/or medium 1220, such as positioning session module 1222 in the location server 1200 shown in FIG. 12.

In one implementation, the array gain distribution variation is due to the use of fixed inter-antenna element spacings in an antenna array for an entire frequency allocation. The array gain distribution variation may include frequency and spatial distortions and impairments in an array gain response. The array gain distribution variation may correspond to gain and direction information of at least one of a main lobe, side lobes, beam nulls, and grating lobes.

In one implementation, the location server receives capability information from the mobile device indicating an ability to use assistance data comprising array gain distribution variation as a function of frequency, e.g., as discussed in stage 2 of FIG. 10. A means for receiving capability information from the mobile device indicating an ability to use assistance data comprising array gain distribution variation as a function of frequency may include, e.g., the external interface 1210 and one or more processors 1202 with dedicated hardware or implementing executable code or software instructions in memory 1204 and/or medium 1220, such as positioning session module 1222 in the location server 1200 shown in FIG. 12.

In one implementation, the array gain distribution variation for the set of beam weighs used in beamforming by the at least one base station may be for a sub-band of an allocated bandwidth, e.g., as discussed in stage 5 of FIG. 10 and FIG. 9A. The size of the sub-band of the allocated bandwidth is configured based on at least one mobile device parameter. For example, the at least one mobile device parameter may be, e.g., at least one of a data rate of the mobile device, capability of the mobile device, and active bandwidth part size in the mobile device. The size of the sub-band is dynamically selected.

In one implementation, the array gain distribution variation for the set of beam weights used in beamforming by the at least one base station may be an aggregation of array gain distribution variations for a plurality of different sub-bands of an allocated bandwidth, e.g., as discussed in stage 5 of FIG. 10 and FIG. 9B. The plurality of different sub-bands of the allocated bandwidth may span an active bandwidth part in the mobile device. The aggregation of the array gain distribution variations for the plurality of different sub-bands of the allocated bandwidth may comprise a weighted average of the array gain distribution variations for the plurality of different sub-bands. The weights in the weighted average may correspond to sizes of the different sub-bands.

In one implementation, the array gain distribution variation for the set of beam weights used in beamforming by the at least one base station may comprise a plurality of array gain distribution variations corresponding to a plurality of different sub-bands of an allocated bandwidth, e.g., as discussed in stage 5 of FIG. 10 and FIG. 9C. The plurality of different sub-bands of the allocated bandwidth may span an active bandwidth part in the mobile device.

In one implementation, the array gain distribution variation as the function of frequency for the set of beam weights used by the at least one base station is a first type of array gain distribution variation comprising one of: a single array gain distribution variation for a sub-band of an allocated bandwidth, an aggregation of array gain distribution variations for a plurality of different sub-bands of the allocated bandwidth, and a plurality of array gain distribution variations corresponding to a plurality of different sub-bands of the allocated bandwidth, e.g., as discussed in stage 5 of FIG. 10 and FIGS. 9A, 9B, and 9C. The location server may prepare second assistance data for positioning, the second assistance data comprising a second type of array gain distribution variation, wherein the second type is different than the first type, e.g., as discussed in stage 5 of FIG. 10. Further the location server may send the second assistance data to the mobile device, e.g., as discussed in stage 6 of FIG. 10. A means for preparing second assistance data for positioning, the second assistance data comprising a second type of array gain distribution variation, wherein the second type is different than the first type, and a means for sending the second assistance data to the mobile device may include, e.g., the external interface 1210 and one or more processors 1202 with dedicated hardware or implementing executable code or software instructions in memory 1204 and/or medium 1220, such as positioning session module 1222 and the array gain distribution variation module 1224 in the location server 1200 shown in FIG. 12. The second assistance data comprising the second type of array gain distribution variation may be prepared based on at least one of type of signaling, latency requirement, and positioning accuracy requirement.

Figure 17:
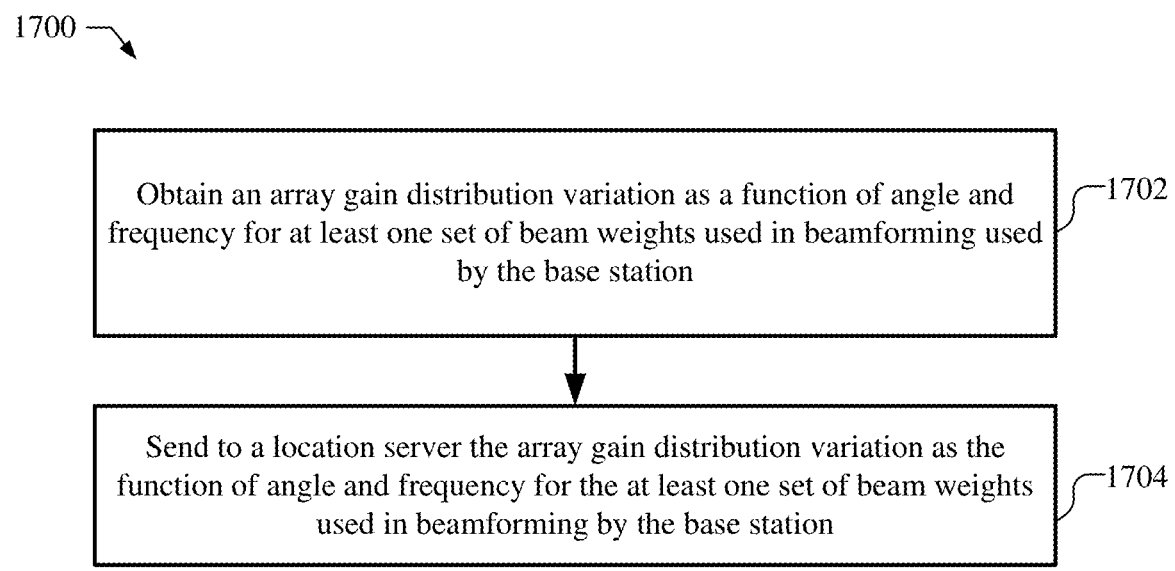
FIG. 17 shows a flowchart for an exemplary method for determining a location of a mobile device performed by a base station.

FIG. 17 shows a flowchart for an exemplary method 1700 for supporting positioning of a mobile device performed by a base station, such as base station 102.

At block 1702, the base station obtains an array gain distribution variation as a function of angle and frequency for at least one set of beam weights used in beamforming used by the base station, e.g., as discussed in stage 4 of FIG. 10. A means for obtaining an array gain distribution variation as a function of angle and frequency for at least one set of beam weights used in beamforming used by the base station may include, e.g., the external interface 1316 and one or more processors 1302 with dedicated hardware or implementing executable code or software instructions in memory 1304 and/or medium 1320, such as positioning session module 1322 and the array gain distribution variation module 1324 in the base station 1300 shown in FIG. 13.

At block 1702, the base station sends to a location server the array gain distribution variation as the function of angle and frequency for the at least one set of beam weights used in beamforming by the base station, e.g., as discussed in stage 4 of FIG. 10. The location server may comprise one of a Location Management Function (LMF), Evolved Serving Mobile Location Center (ESMLC), or Location Server Surrogate (LSS). A means for sending to a location server the array gain distribution variation as the function of angle and frequency for the at least one set of beam weights used in beamforming by the base station may include, e.g., the external interface 1316 and one or more processors 1302 with dedicated hardware or implementing executable code or software instructions in memory 1304 and/or medium 1320, such as positioning session module 1322 in the base station 1300 shown in FIG. 13.

In one implementation, the array gain distribution variation is due to the use of fixed inter-antenna element spacings in an antenna array for an entire frequency allocation. The array gain distribution variation may include frequency and spatial distortions and impairments in an array gain response. The array gain distribution variation may correspond to gain and direction information of at least one of a main lobe, side lobes, beam nulls, and grating lobes.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation Examples are Described in the Following Numbered Clauses

1. A method for supporting positioning of a mobile device in a wireless network performed by the mobile device, the method comprising:
receiving assistance data for positioning, the assistance data comprising an array gain distribution variation as a function of angle and frequency for a set of beam weights used in beamforming by at least one base station;
measuring at least one angle based positioning measurement of reference signals received from the at least one base station based on the assistance data; and
generating position information based on the at least one angle based positioning measurement.

2. The method of clause 1, wherein a variation in array gain distribution described by the array gain distribution variation in the assistance data is due to the use of fixed inter-antenna element spacings in an antenna array for an entire frequency allocation by the at least one base station.

3. The method of any of clauses 1-2, wherein the array gain distribution variation includes frequency and spatial distortions and impairments in an array gain response.

4. The method of any of clauses 1-3, wherein the array gain distribution variation corresponds to gain and direction information of at least one of a main lobe, side lobes, beam nulls, and grating lobes.

5. The method of any of clauses 1-4, wherein measuring the at least one angle based positioning measurement of reference signals received from the at least one base station comprises determining at least one downlink (DL) Angle of Departure (AOD) measurement for at least one positioning reference signal transmitted by the at least one base station based on the array gain distribution variation for the set of beam weights used in beamforming by the at least one base station.

6. The method of any of clauses 1-5, wherein the position information comprises one of the at least one angle based positioning measurement, a position estimate determined based on the at least one angle based positioning measurement, and a combination thereof, the method further comprising sending the position information to a network node.

7. The method of clause 6, wherein the network node is a base station or a location server.

8. The method of clause 7, wherein the location server comprises one of a Location Management Function (LMF), Evolved Serving Mobile Location Center (ESMLC), Location Server Surrogate (LSS), or a serving base station.

9. The method of any of clauses 1-8, further comprising sending capability information to a network node indicating an ability to communicate and use assistance data comprising frequency variation of array gain for the beam weights used by the at least one base station.

10. The method of any of clauses 1-9, wherein the at least one angle based positioning measurement comprises at least one downlink Angle of Departure measurement.

11. The method of any of clauses 1-10, wherein the array gain distribution variation for the set of beam weights used in beamforming by the at least one base station is for a sub-band of an allocated bandwidth.

12. The method of any of clause 11, wherein a size of the sub-band of the allocated bandwidth is configured based on at least one mobile device parameter.

13. The method of any of clause 12, wherein the at least one mobile device parameter comprises at least one of a data rate of the mobile device, capability of the mobile device, and active bandwidth part size in the mobile device.

14. The method of any of clause 12, wherein the size of the sub-band is dynamically selected.

15. The method of any of clauses 1-10, wherein the array gain distribution variation for the set of beam weights used in beamforming by the at least one base station is an aggregation of array gain distribution variations for a plurality of different sub-bands of an allocated bandwidth.

16. The method of any of clause 15, wherein the plurality of different sub-bands of the allocated bandwidth spans an active bandwidth part in the mobile device.

17. The method of any of clause 15, wherein the aggregation of the array gain distribution variations for the plurality of different sub-bands of the allocated bandwidth comprises a weighted average of the array gain distribution variations for the plurality of different sub-bands.

18. The method of any of clause 17, wherein weights in the weighted average correspond to sizes of the different sub-bands.

19. The method of any of clauses 1-10, wherein the array gain distribution variation for the set of beam weights used in beamforming by the at least one base station comprises a plurality of array gain distribution variations corresponding to a plurality of different sub-bands of an allocated bandwidth.

20. The method of any of clause 19, wherein the plurality of different sub-bands of the allocated bandwidth spans an active bandwidth part in the mobile device.

21. The method of any of clauses 1-10, wherein the array gain distribution variation as the function of frequency for the set of beam weights used by the at least one base station is a first type of array gain distribution variation comprising one of: a single array gain distribution variation for a sub-band of an allocated bandwidth, an aggregation of array gain distribution variations for a plurality of different sub-bands of the allocated bandwidth, and a plurality of array gain distribution variations corresponding to a plurality of different sub-bands of the allocated bandwidth, the method further comprising:

receiving second assistance data for positioning, the second assistance data comprising a second type of array gain distribution variation, wherein the second type is different than the first type.

22. The method of clause 21, wherein the second assistance data comprising the second type of array gain distribution variation is received based on at least one of type of signaling, latency requirement, and positioning accuracy requirement.

23. A mobile device configured for supporting positioning of the mobile device in a wireless network, comprising:

a wireless transceiver configured to wirelessly communicate in the wireless network;
at least one memory;
at least one processor coupled to the wireless transceiver and the at least one memory, wherein the at least one processor is configured to:
receive, via the wireless transceiver, assistance data for positioning, the assistance data comprising an array gain distribution variation as a function of angle and frequency for a set of beam weights used in beamforming by at least one base station;
measure at least one angle based positioning measurement of reference signals received from the at least one base station based on the assistance data; and
generate position information based on the at least one angle based positioning measurement.

24. The mobile device of clause 23, wherein a variation in array gain distribution described by the array gain distribution variation in the assistance data is due to the use of fixed inter-antenna element spacings in an antenna array for an entire frequency allocation by the at least one base station.

25. The mobile device of any of clauses 23-24, wherein the array gain distribution variation includes frequency and spatial distortions and impairments in an array gain response.

26. The mobile device of any of clauses 23-25, wherein the array gain distribution variation corresponds to gain and direction information of at least one of a main lobe, side lobes, beam nulls, and grating lobes.

27. The mobile device of any of clauses 23-26, wherein the at least one processor is configured to measure the at least one angle based positioning measurement of reference signals received from the at least one base station by being configured to determine at least one downlink (DL) Angle of Departure (AOD) measurement for at least one positioning reference signal transmitted by the at least one base station based on the array gain distribution variation for the set of beam weights used in beamforming by the at least one base station.

28. The mobile device of any of clauses 23-27, wherein the position information comprises one of the at least one angle based positioning measurement, a position estimate determined based on the at least one angle based positioning measurement, and a combination thereof, the at least one processor is further configured to send, via the transceiver, the position information to a network node.

29. The mobile device of clause 28, wherein the network node is a base station or a location server.

30. The mobile device of clause 29, wherein the location server comprises one of a Location Management Function (LMF), Evolved Serving Mobile Location Center (ESMLC), Location Server Surrogate (LSS), or a serving base station.

31. The mobile device of any of clauses 23-30, wherein the at least one processor is further configured to send capability information to a network node indicating an ability to communicate and use assistance data comprising frequency variation of array gain for the beam weights used by the at least one base station.

32. The mobile device of any of clauses 23-31, wherein the at least one angle based positioning measurement comprises at least one downlink Angle of Departure measurement.

33. The mobile device of any of clauses 23-32, wherein the array gain distribution variation for the set of beam weights used in beamforming by the at least one base station is for a sub-band of an allocated bandwidth.

34. The mobile device of any of clause 33, wherein a size of the sub-band of the allocated bandwidth is configured based on at least one mobile device parameter.

35. The mobile device of any of clause 34, wherein the at least one mobile device parameter comprises at least one of a data rate of the mobile device, capability of the mobile device, and active bandwidth part size in the mobile device.

36. The mobile device of any of clause 34, wherein the size of the sub-band is dynamically selected.

37. The mobile device of any of clauses 23-32, wherein the array gain distribution variation for the set of beam weights used in beamforming by the at least one base station is an aggregation of array gain distribution variations for a plurality of different sub-bands of an allocated bandwidth.

38. The mobile device of any of clause 37, wherein the plurality of different sub-bands of the allocated bandwidth spans an active bandwidth part in the mobile device.

39. The mobile device of any of clause 37, wherein the aggregation of the array gain distribution variations for the plurality of different sub-bands of the allocated bandwidth comprises a weighted average of the array gain distribution variations for the plurality of different sub-bands.

40. The mobile device of any of clause 39, wherein weights in the weighted average correspond to sizes of the different sub-bands.

41. The mobile device of any of clauses 23-32, wherein the array gain distribution variation for the set of beam weights used in beamforming by the at least one base station comprises a plurality of array gain distribution variations corresponding to a plurality of different sub-bands of an allocated bandwidth.

42. The mobile device of any of clause 41, wherein the plurality of different sub-bands of the allocated bandwidth spans an active bandwidth part in the mobile device.

43. The mobile device of any of clauses 23-32, wherein the array gain distribution variation as the function of frequency for the set of beam weights used by the at least one base station is a first type of array gain distribution variation comprising one of: a single array gain distribution variation for a sub-band of an allocated bandwidth, an aggregation of array gain distribution variations for a plurality of different sub-bands of the allocated bandwidth, and a plurality of array gain distribution variations corresponding to a plurality of different sub-bands of the allocated bandwidth, wherein the at least one processor is further configured to:

receive second assistance data for positioning, the second assistance data comprising a second type of array gain distribution variation, wherein the second type is different than the first type.

44. The mobile device of clause 43, wherein the second assistance data comprising the second type of array gain distribution variation is received based on at least one of type of signaling, latency requirement, and positioning accuracy requirement.

45. A method for supporting positioning of a mobile device in a wireless network performed by a location server, the method comprising:

obtaining an array gain distribution variation as a function of angle and frequency for a set of beam weights used in beamforming by at least one base station;

receiving at least one angle based positioning measurement for the mobile device from at least one network node; and determining a position estimate of the mobile device based on the at least one angle based positioning measurement and the array gain distribution variation as the function of angle and frequency for the set of beam weights used by the at least one base station.

46. The method of clause 45, wherein a variation in array gain distribution described by the array gain distribution variation in the assistance data is due to the use of fixed inter-antenna element spacings in an antenna array for an entire frequency allocation by the at least one base station 47. The method of any of clauses 45-46, wherein the array gain distribution variation includes frequency and spatial distortions and impairments in an array gain response.

48. The method of any of clauses 45-47, wherein the array gain distribution variation corresponds to gain and direction information of at least one of a main lobe, side lobes, beam nulls, and grating lobes.

49. The method of any of clauses 45-48, wherein the location server comprises one of a Location Management Function (LMF), Evolved Serving Mobile Location Center (ESMLC), Location Server Surrogate (LSS), or serving base station.

50. The method of any of clauses 45-49, wherein the at least one network node comprises the mobile device and the array gain distribution variation is for a transmit beam pattern corresponding to the set of beam weights used in beamforming by the at least one base station, and wherein determining the position estimate of the mobile device comprises:

determining at least one downlink (DL) Angle of Departure (AOD) measurement for the mobile device for a positioning reference signal transmitted by the at least one base station based on the at least one angle based positioning measurement received from the mobile device and the array gain distribution variation for the transmit beam pattern corresponding to the set of beam weights used in beamforming by the at least one base station; and estimating the position estimate based at least in part on the DL AOD measurement.

51. The method of any of clauses 45-50, wherein the at least one network node comprises the at least one base station and the array gain distribution variation is for a receive beam pattern corresponding to the set of beam weights used in beamforming by the at least one base station, and wherein determining the position estimate of the mobile device comprises:

determining at least one uplink (UL) Angle of Arrival (AOA) measurement for the mobile device for a sounding reference signal transmitted by the mobile device based on the at least one angle based positioning measurement received from the at least one base station and the array gain distribution variation for the receive beam pattern corresponding to the set of beam weights used in beamforming by the at least one base station; and estimating the position estimate based at least in part on the UL AOA measurement.

52. The method of any of clauses 45-51, wherein the array gain distribution variation for the set of beam weighs used in beamforming by the at least one base station is for a sub-band of an allocated bandwidth.

53. The method of any of clause 52, wherein a size of the sub-band of the allocated bandwidth is configured based on at least one mobile device parameter.

54. The method of any of clause 52, wherein the at least one mobile device parameter comprises at least one of a data rate of the mobile device, capability of the mobile device, and active bandwidth part size in the mobile device.

55. The method of any of clause 52, wherein the size of the sub-band is dynamically selected.

56. The method of any of clauses 45-51, wherein the array gain distribution variation for the set of beam weights used in beamforming by the at least one base station is an aggregation of array gain distribution variations for a plurality of different sub-bands of an allocated bandwidth.

57. The method of any of clause 56, wherein the plurality of different sub-bands of the allocated bandwidth spans an active bandwidth part in the mobile device.

58. The method of any of clause 56, wherein the aggregation of the array gain distribution variations for the plurality of different sub-bands of the allocated bandwidth comprises a weighted average of the array gain distribution variations for the plurality of different sub-bands.

59. The method of any of clause 58, wherein weights in the weighted average correspond to sizes of the different sub-bands.

60. The method of any of clauses 45-51, wherein the array gain distribution variation for the set of beam weights used in beamforming by the at least one base station comprises a plurality of array gain distribution variations corresponding to a plurality of different sub-bands of an allocated bandwidth.

61. The method of any of clause 60, wherein the plurality of different sub-bands of the allocated bandwidth of the beam pattern spans an active bandwidth part in the mobile device.

62. A location server for supporting positioning of a mobile device in a wireless network, comprising:

an external interface configured to communicate in the wireless network;

at least one memory;

at least one processor coupled to the external interface and the at least one memory, wherein the at least one processor is configured to:

obtain, via the external interface, an array gain distribution variation as a function of angle and frequency for a set of beam weights used in beamforming by at least one base station;

receive, via the external interface, at least one angle based positioning measurement for the mobile device from at least one network node; and determine a position estimate of the mobile device based on the at least one angle based positioning measurement and the array gain distribution variation as the function of angle and frequency for the set of beam weights used by the at least one base station.

63. The location server of clause 62, wherein a variation in array gain distribution described by the array gain distribution variation in the assistance data is due to the use of fixed inter-antenna element spacings in an antenna array for an entire frequency allocation by the at least one base station.

64. The location server of any of clauses 62-63, wherein the array gain distribution variation includes frequency and spatial distortions and impairments in an array gain response.

65. The location server of any of clauses 62-64, wherein the array gain distribution variation corresponds to gain and direction information of at least one of a main lobe, side lobes, beam nulls, and grating lobes.

66. The location server of any of clauses 62-65, wherein the location server comprises one of a Location Management Function (LMF), Evolved Serving Mobile Location Center (ESMLC), Location Server Surrogate (LSS), or serving base station.

67. The location server of any of clauses 62-66, wherein the at least one network node comprises the mobile device and the array gain distribution variation is for a transmit beam pattern corresponding to the set of beam weights used in beamforming by the at least one base station, and wherein the at least one processor is configured to determine the position estimate of the mobile device by being configured to:

determine at least one downlink (DL) Angle of Departure (AOD) measurement for the mobile device for a positioning reference signal transmitted by the at least one base station based on the at least one angle based positioning measurement received from the mobile device and the array gain distribution variation for the transmit beam pattern corresponding to the set of beam weights used in beamforming by the at least one base station; and estimate the position estimate based at least in part on the DL AOD measurement.

68. The location server of any of clauses 62-67, wherein the at least one network node comprises the at least one base station and the array gain distribution variation is for a receive beam pattern corresponding to the at least one set of beam weights used in beamforming by the at least one base station, and wherein the at least one processor is configured to determine the position estimate of the mobile device by being configured to:

determine at least one uplink (UL) Angle of Arrival (AOA) measurement for the mobile device for a sounding reference signal transmitted by the mobile device based on the at least one angle based positioning measurement received from the at least one base station and the array gain distribution variation for the receive beam pattern corresponding to the at least one set of beam weights used in beamforming by the at least one base station; and estimate the position estimate based at least in part on the UL AOA measurement.

69. The location server of any of clauses 62-68, wherein the array gain distribution variation for the set of beam weighs used in beamforming by the at least one base station is for a sub-band of an allocated bandwidth.

70. The location server of any of clause 69, wherein a size of the sub-band of the allocated bandwidth is configured based on at least one mobile device parameter.

71. The location server of any of clause 69, wherein the at least one mobile device parameter comprises at least one of a data rate of the mobile device, capability of the mobile device, and active bandwidth part size in the mobile device.

72. The location server of any of clause 69, wherein the size of the sub-band is dynamically selected.

73. The location server of any of clauses 62-68, wherein the array gain distribution variation for the set of beam weights used in beamforming by the at least one base station is an aggregation of array gain distribution variations for a plurality of different sub-bands of an allocated bandwidth.

74. The location server of any of clause 73, wherein the plurality of different sub-bands of the allocated bandwidth spans an active bandwidth part in the mobile device.

75. The location server of any of clause 73, wherein the aggregation of the array gain distribution variations for the plurality of different sub-bands of the allocated bandwidth comprises a weighted average of the array gain distribution variations for the plurality of different sub-bands.

76. The location server of any of clause 75, wherein weights in the weighted average correspond to sizes of the different sub-bands.

77. The location server of any of clauses 62-68, wherein the array gain distribution variation for the set of beam weights used in beamforming by the at least one base station comprises a plurality of array gain distribution variations corresponding to a plurality of different sub-bands of an allocated bandwidth.

78. The location server of any of clause 77, wherein the plurality of different sub-bands of the allocated bandwidth of the beam pattern spans an active bandwidth part in the mobile device.

79. A method for supporting positioning of a mobile device in a wireless network performed by a location server, the method comprising:

obtaining an array gain distribution variation as a function of angle and frequency for at least one set of beam weights used in beamforming by at least one base station;

preparing assistance data for positioning for the mobile device based on the array gain distribution variation as the function of angle and frequency for the at least one set of beam weights used in beamforming by the at least one base station; and sending to the mobile device the assistance data for positioning with the array gain distribution variation as the function of angle and frequency for the at least one set of beam weights used in beamforming by the at least one base station.

80. The method of clause 79, wherein a variation in array gain distribution described by the array gain distribution variation in the assistance data is due to the use of fixed inter-antenna element spacings in an antenna array for an entire frequency allocation by the at least one base station.

81. The method of any of clauses 79-80, wherein the array gain distribution variation includes frequency and spatial distortions and impairments in an array gain response.

82. The method of any of clauses 79-81, wherein the array gain distribution variation corresponds to gain and direction information of at least one of a main lobe, side lobes, beam nulls, and grating lobes.

83. The method of any of clauses 79-82, wherein the location server comprises one of a Location Management Function (LMF), Evolved Serving Mobile Location Center (ESMLC), Location Server Surrogate (LSS), or serving base station.

84. The method of any of clauses 79-83, further comprising receiving capability information from the mobile device indicating an ability to use assistance data comprising array gain distribution variation as a function of frequency.

85. The method of any of clauses 79-84, wherein the array gain distribution variation in the assistance data is for a sub-band of an allocated bandwidth.

86. The method of any of clause 85, wherein a size of the sub-band of the allocated bandwidth is configured based on at least one mobile device parameter.

87. The method of any of clause 86, wherein the at least one mobile device parameter comprises at least one of a data rate of the mobile device, capability of the mobile device, and active bandwidth part size in the mobile device.

88. The method of any of clause 86, wherein the size of the sub-band is dynamically selected.

89. The method of any of clauses 79-88, wherein the array gain distribution variation in the assistance data is an aggregation of array gain distribution variations for a plurality of different sub-bands of an allocated bandwidth.

90. The method of any of clause 89, wherein the plurality of different sub-bands of the allocated bandwidth spans an active bandwidth part in the mobile device.

91. The method of any of clause 89, wherein the aggregation of the array gain distribution variations for the plurality of different sub-bands of the allocated bandwidth comprises a weighted average of the array gain distribution variations for the plurality of different sub-bands.

92. The method of any of clause 91, wherein weights in the weighted average correspond to sizes of the different sub-bands.

93. The method of any of clauses 79-88, wherein the array gain distribution variation in the assistance data comprises a plurality of array gain distribution variations corresponding to a plurality of different sub-bands of an allocated bandwidth.

94. The method of any of clause 60, wherein the plurality of different sub-bands of the allocated bandwidth spans an active bandwidth part in the mobile device.

95. The method of any of clauses 79-88, wherein the array gain distribution variation in the assistance data is a first type of array gain distribution variation comprising one of: a sub-band of an allocated bandwidth, an aggregation of array gain distribution variations for a plurality of different sub-bands of the allocated bandwidth, and a plurality of array gain distribution variations corresponding to a plurality of different sub-bands of the allocated bandwidth, the method further comprising:
preparing second assistance data for positioning, the second assistance data comprising a second type of array gain distribution variation, wherein the second type is different than the first type; and
sending the second assistance data to the mobile device.

96. The method of clause 95, wherein the second assistance data comprising the second type of array gain distribution variation is prepared based on at least one of type of signaling, latency requirement, and positioning accuracy requirement.

97. A location server configured for supporting positioning of a mobile device in a wireless network, comprising:
an external interface configured to communicate in the wireless network;
at least one memory;
at least one processor coupled to the external interface and the at least one memory, wherein the at least one processor is configured to:
obtain, via the external interface, an array gain distribution variation as a function of angle and frequency for at least one set of beam weights used in beamforming by at least one base station;
prepare assistance data for positioning for the mobile device based on the array gain distribution variation as the function of angle and frequency for the at least one set of beam weights used in beamforming by the at least one base station; and
send, via the external interface, to the mobile device the assistance data for positioning with the array gain distribution variation as the function of angle and frequency for the at least one set of beam weights used in beamforming by the at least one base station.

98. The location server of clause 97, wherein a variation in array gain distribution described by the array gain distribution variation in the assistance data is due to the use of fixed inter-antenna element spacings in an antenna array for an entire frequency allocation by the at least one base station.

99. The location server of any of clauses 97-98, wherein the array gain distribution variation includes frequency and spatial distortions and impairments in an array gain response.

100. The location server of any of clauses 97-99, wherein the array gain distribution variation corresponds to gain and direction information of at least one of a main lobe, side lobes, beam nulls, and grating lobes.

101. The location server of any of clauses 97-100, wherein the location server comprises one of a Location Management Function (LMF), Evolved Serving Mobile Location Center (ESMLC), Location Server Surrogate (LSS), or serving base station.

102. The location server of any of clauses 97-101, wherein the at least one processor is further configured to receive capability information from the mobile device indicating an ability to use assistance data comprising array gain distribution variation as a function of frequency.

103. The location server of any of clauses 97-102, wherein the array gain distribution variation in the assistance data is for a sub-band of an allocated bandwidth.

104. The location server of any of clause 103, wherein a size of the sub-band of the allocated bandwidth is configured based on at least one mobile device parameter.

105. The location server of any of clause 104, wherein the at least one mobile device parameter comprises at least one of a data rate of the mobile device, capability of the mobile device, and active bandwidth part size in the mobile device.

106. The location server of any of clause 104, wherein the size of the sub-band is dynamically selected.

107. The location server of any of clauses 97-102, wherein the array gain distribution variation in the assistance data is an aggregation of array gain distribution variations for a plurality of different sub-bands of an allocated bandwidth.

108. The location server of any of clause 107, wherein the plurality of different sub-bands of the allocated bandwidth spans an active bandwidth part in the mobile device.

109. The location server of any of clause 107, wherein the aggregation of the array gain distribution variations for the plurality of different sub-bands of the allocated bandwidth comprises a weighted average of the array gain distribution variations for the plurality of different sub-bands.

110. The location server of any of clause 109, wherein weights in the weighted average correspond to sizes of the different sub-bands.

111. The location server of any of clauses 97-102, wherein the array gain distribution variation in the assistance data comprises a plurality of array gain distribution variations corresponding to a plurality of different sub-bands of an allocated bandwidth.

112. The location server of any of clause 111, wherein the plurality of different sub-bands of the allocated bandwidth spans an active bandwidth part in the mobile device.

113. The location server of any of clauses 97-102, wherein the array gain distribution variation in the assistance data is a first type of array gain distribution variation comprising one of: a sub-band of an allocated bandwidth, an aggregation of array gain distribution variations for a plurality of different sub-bands of the allocated bandwidth, and a plurality of array gain distribution variations corresponding to a plurality of different sub-bands of the allocated bandwidth, wherein the at least one processor is further configured to:
prepare second assistance data for positioning, the second assistance data comprising a second type of array gain distribution variation, wherein the second type is different than the first type; and
send, via the external interface, the second assistance data to the mobile device.

114. The location server of clause 113, wherein the second assistance data comprising the second type of array gain distribution variation is prepared based on at least one of type of signaling, latency requirement, and positioning accuracy requirement.

115. A method for supporting positioning of a mobile device in a wireless network performed by a base station, the method comprising:
obtaining an array gain distribution variation as a function of angle and frequency for at least one set of beam weights used in beamforming used by the base station; and
sending to a location server the array gain distribution variation as the function of angle and frequency for the at least one set of beam weights used in beamforming by the base station.

116. The method of clause 115, wherein a variation in array gain distribution described by the array gain distribution variation in the assistance data is due to the use of fixed inter-antenna element spacings in an antenna array for an entire frequency allocation by the at least one base station.

117. The method of any of clauses 115-116, wherein the array gain distribution variation includes frequency and spatial distortions and impairments in an array gain response.

118. The method of any of clauses 115-117, wherein the array gain distribution variation corresponds to gain and direction information of at least one of a main lobe, side lobes, beam nulls, and grating lobes.

119. The method of any of clauses 115-118, wherein the location server comprises one of a Location Management Function (LMF), Evolved Serving Mobile Location Center (ESMLC), or Location Server Surrogate (LSS).

120. A base station configured for supporting positioning of a mobile device in a wireless network, comprising:
an external interface configured to communicate with the wireless network;
at least one memory;
at least one processor coupled to the external interface and the at least one memory, wherein the at least one processor is configured to:
obtain an array gain distribution variation as a function of angle and frequency for at least one set of beam weights used in beamforming used by the base station; and
send, via the external interface, to a location server the array gain distribution variation as the function of angle and frequency for the at least one set of beam weights used in beamforming by the base station.

121. The base station of clause 120, wherein a variation in array gain distribution described by the array gain distribution variation in the assistance data is due to the use of fixed inter-antenna element spacings in an antenna array for an entire frequency allocation by the at least one base station.

122. The base station of any of clauses 120-121, wherein the array gain distribution variation includes frequency and spatial distortions and impairments in an array gain response.

123. The base station of any of clauses 120-122, wherein the array gain distribution variation corresponds to gain and direction information of at least one of a main lobe, side lobes, beam nulls, and grating lobes.

124. The base station of any of clauses 120-123, wherein the location server comprises one of a Location Management Function (LMF), Evolved Serving Mobile Location Center (ESMLC), or Location Server Surrogate (LSS).

Therefore, it is intended that claimed subject matter not be limited to the particular examples disclosed, but that such claimed subject matter may also include all aspects falling within the scope of appended claims, and equivalents thereof.

What is claimed is:

1. A method for supporting positioning of a mobile device in a wireless network performed by the mobile device, the method comprising:
receiving assistance data for positioning, the assistance data comprising an array gain distribution variation as a function of angle and frequency for a set of beam weights used in beamforming by at least one base station;
measuring at least one angle based positioning measurement of reference signals received from the at least one base station based on the assistance data; and
generating position information based on the at least one angle based positioning measurement.

2. The method of claim 1, wherein a variation in array gain distribution described by the array gain distribution variation in the assistance data is due to the use of fixed inter-antenna element spacings in an antenna array for an entire frequency allocation by the at least one base station.

3. The method of claim 1, wherein the array gain distribution variation includes frequency and spatial distortions and impairments in an array gain response.

4. The method of claim 1, wherein the array gain distribution variation corresponds to gain and direction information of at least one of a main lobe, side lobes, beam nulls, and grating lobes.

5. The method of claim 1, wherein measuring the at least one angle based positioning measurement of reference signals received from the at least one base station comprises determining at least one downlink (DL) Angle of Departure (AOD) measurement for at least one positioning reference signal transmitted by the at least one base station based on the array gain distribution variation for the set of beam weights used in beamforming by the at least one base station.

6. The method of claim 1, wherein the position information comprises one of the at least one angle based positioning measurement, a position estimate determined based on the at least one angle based positioning measurement, and a combination thereof, the method further comprising sending the position information to a network node.

7. The method of claim 6, wherein the network node is a base station or a location server.

8. The method of claim 7, wherein the location server comprises one of a Location Management Function (LMF), Evolved Serving Mobile Location Center (ESMLC), Location Server Surrogate (LSS), or a serving base station.

9. The method of claim 1, further comprising sending capability information to a network node indicating an ability to communicate and use assistance data comprising frequency variation of array gain for the set of beam weights used by the at least one base station.

10. The method of claim 1, wherein the at least one angle based positioning measurement comprises at least one downlink Angle of Departure measurement.

11. The method of claim 1, wherein the array gain distribution variation for the set of beam weights used in beamforming by the at least one base station is for a sub-band of an allocated bandwidth.

12. The method of claim 11, wherein a size of the sub-band of the allocated bandwidth is configured based on at least one mobile device parameter.

13. The method of claim 12, wherein the at least one mobile device parameter comprises at least one of a data rate of the mobile device, capability of the mobile device, and active bandwidth part size in the mobile device.

14. The method of claim 12, wherein the size of the sub-band is dynamically selected.

15. The method of claim 1, wherein the array gain distribution variation for the set of beam weights used in beamforming by the at least one base station is an aggregation of array gain distribution variations for a plurality of different sub-bands of an allocated bandwidth.

16. The method of claim 15, wherein the plurality of different sub-bands of the allocated bandwidth spans an active bandwidth part in the mobile device.

17. The method of claim 15, wherein the aggregation of the array gain distribution variations for the plurality of different sub-bands of the allocated bandwidth comprises a weighted average of the array gain distribution variations for the plurality of different sub-bands.

18. The method of claim 17, wherein weights in the weighted average correspond to sizes of the different sub-bands.

19. The method of claim 1, wherein the array gain distribution variation for the set of beam weights used in beamforming by the at least one base station comprises a plurality of array gain distribution variations corresponding to a plurality of different sub-bands of an allocated bandwidth.

20. The method of claim 19, wherein the plurality of different sub-bands of the allocated bandwidth spans an active bandwidth part in the mobile device.

21. The method of claim 1, wherein the array gain distribution variation as the function of angle and frequency for the set of beam weights used by the at least one base station is a first type of array gain distribution variation comprising one of: a single array gain distribution variation for a sub-band of an allocated bandwidth, an aggregation of array gain distribution variations for a plurality of different sub-bands of the allocated bandwidth, and a plurality of array gain distribution variations corresponding to a plurality of different sub-bands of the allocated bandwidth, the method further comprising:

receiving second assistance data for positioning, the second assistance data comprising a second type of array gain distribution variation, wherein the second type is different than the first type.

22. The method of claim 21, wherein the second assistance data comprising the second type of array gain distribution variation is received based on at least one of type of signaling, latency requirement, and positioning accuracy requirement.

23. A mobile device configured for supporting positioning of the mobile device in a wireless network, comprising:
a wireless transceiver configured to wirelessly communicate in the wireless network;
at least one memory;
at least one processor coupled to the wireless transceiver and the at least one memory, wherein the at least one processor is configured to:
receive, via the wireless transceiver, assistance data for positioning, the assistance data comprising an array gain distribution variation as a function of angle and frequency for a set of beam weights used in beamforming by at least one base station;
measure at least one angle based positioning measurement of reference signals received from the at least one base station based on the assistance data; and
generate position information based on the at least one angle based positioning measurement.

24. The mobile device of claim 23, wherein a variation in array gain distribution described by the array gain distribution variation in the assistance data is due to the use of fixed inter-antenna element spacings in an antenna array for an entire frequency allocation by the at least one base station.

25. The mobile device of claim 23, wherein the array gain distribution variation includes frequency and spatial distortions and impairments in an array gain response.

26. The mobile device of claim 23, wherein the array gain distribution variation corresponds to gain and direction information of at least one of a main lobe, side lobes, beam nulls, and grating lobes.

27. The mobile device of claim 23, wherein the at least one processor is configured to measure the at least one angle based positioning measurement of reference signals received from the at least one base station by being configured to determine at least one downlink (DL) Angle of Departure (AOD) measurement for at least one positioning reference signal transmitted by the at least one base station based on the array gain distribution variation for the set of beam weights used in beamforming by the at least one base station.

28. The mobile device of claim 23, wherein the position information comprises one of the at least one angle based positioning measurement, a position estimate determined based on the at least one angle based positioning measurement, and a combination thereof, the at least one processor is further configured to send, via the wireless transceiver, the position information to a network node.

29. The mobile device of claim 28, wherein the network node is a base station or a location server.

30. The mobile device of claim 29, wherein the location server comprises one of a Location Management Function (LMF), Evolved Serving Mobile Location Center (ESMLC), Location Server Surrogate (LSS), or a serving base station.

31. The mobile device of claim 23, wherein the at least one processor is further configured to send capability information to a network node indicating an ability to communicate and use assistance data comprising frequency variation of array gain for the set of beam weights used by the at least one base station.

32. The mobile device of claim 23, wherein the at least one angle based positioning measurement comprises at least one downlink Angle of Departure measurement.

33. The mobile device of claim 23, wherein the array gain distribution variation for the set of beam weights used in beamforming by the at least one base station is for a sub-band of an allocated bandwidth.

34. The mobile device of claim 33, wherein a size of the sub-band of the allocated bandwidth is configured based on at least one mobile device parameter.

35. The mobile device of claim 34, wherein the at least one mobile device parameter comprises at least one of a data rate of the mobile device, capability of the mobile device, and active bandwidth part size in the mobile device.

36. The mobile device of claim 34, wherein the size of the sub-band is dynamically selected.

37. The mobile device of claim 23, wherein the array gain distribution variation for the set of beam weights used in beamforming by the at least one base station is an aggregation of array gain distribution variations for a plurality of different sub-bands of an allocated bandwidth.

38. The mobile device of claim 37, wherein the plurality of different sub-bands of the allocated bandwidth spans an active bandwidth part in the mobile device.

39. The mobile device of claim 37, wherein the aggregation of the array gain distribution variations for the plurality of different sub-bands of the allocated bandwidth comprises a weighted average of the array gain distribution variations for the plurality of different sub-bands.

40. The mobile device of claim 39, wherein weights in the weighted average correspond to sizes of the different sub-bands.

41. The mobile device of claim 23, wherein the array gain distribution variation for the set of beam weights used in beamforming by the at least one base station comprises a plurality of array gain distribution variations corresponding to a plurality of different sub-bands of an allocated bandwidth.

42. The mobile device of claim 41, wherein the plurality of different sub-bands of the allocated bandwidth spans an active bandwidth part in the mobile device.

43. The mobile device of claim 23, wherein the array gain distribution variation as the function of angle and frequency for the set of beam weights used by the at least one base station is a first type of array gain distribution variation comprising one of: a single array gain distribution variation for a sub-band of an allocated bandwidth, an aggregation of array gain distribution variations for a plurality of different sub-bands of the allocated bandwidth, and a plurality of array gain distribution variations corresponding to a plurality of different sub-bands of the allocated bandwidth, wherein the at least one processor is further configured to:
receive second assistance data for positioning, the second assistance data comprising a second type of array gain distribution variation, wherein the second type is different than the first type.

44. The mobile device of claim 43, wherein the second assistance data comprising the second type of array gain distribution variation is received based on at least one of type of signaling, latency requirement, and positioning accuracy requirement.

45. A mobile device configured for supporting positioning of the mobile device in a wireless network, comprising:
means for receiving assistance data for positioning, the assistance data comprising an array gain distribution variation as a function of angle and frequency for a set of beam weights used in beamforming by at least one base station;
means for measuring at least one angle based positioning measurement of reference signals received from the at least one base station based on the assistance data; and
means for generating position information based on the at least one angle based positioning measurement.

46. A non-transitory storage medium including program code stored thereon, the program code is operable to configure at least one processor in a mobile device to support positioning of the mobile device in a wireless network, comprising:
program code to receive assistance data for positioning, the assistance data comprising an array gain distribution variation as a function of angle and frequency for a set of beam weights used in beamforming by at least one base station;
program code to measure at least one angle based positioning measurement of reference signals received from the at least one base station based on the assistance data; and
program code to generate position information based on the at least one angle based positioning measurement.

* * * * *